United States Patent [19]
York et al.

[11] Patent Number: 6,002,881
[45] Date of Patent: Dec. 14, 1999

[54] COPROCESSOR DATA ACCESS CONTROL

[75] Inventors: Richard York; David James Seal; Dominic Hugo Symes, all of Cambridge, United Kingdom

[73] Assignee: Arm Limited, Cambridge, United Kingdom

[21] Appl. No.: 08/932,053

[22] Filed: Sep. 17, 1997

[30] Foreign Application Priority Data

Jun. 10, 1997 [GB] United Kingdom ............... 9712041

[51] Int. Cl.[6] ........................ G06F 13/12; G06F 9/06
[52] U.S. Cl. .................... 395/800.34; 395/566; 711/147
[58] Field of Search ................. 395/555, 558, 395/559, 560, 838, 800.36, 733, 800.34, 750.02, 750.01, 309, 800.03, 200.87, 290.55, 500, 842, 800.23, 566, 563; 345/503; 364/DIG. 1, DIG. 2; 711/147, 165, 167

[56] References Cited

U.S. PATENT DOCUMENTS

| | | | |
|---|---|---|---|
| 4,943,915 | 7/1990 | Wilhelm et al. | 395/800.34 |
| 5,193,159 | 3/1993 | Hashimoto et al. | 395/290 |

FOREIGN PATENT DOCUMENTS

| | | |
|---|---|---|
| 0442041 A2 | 8/1991 | European Pat. Off. . |
| 0 703 529 | 3/1996 | European Pat. Off. . |
| 2 637 708 | 4/1990 | France . |

OTHER PUBLICATIONS

XP–002061358, The Implementation of the ARM, Section 4.1.9 Coprocessor Data Transfer Instructions, S. B. Furber: "VLSI RISC Architecture and Organization", 1989, pp. 261–265.

*Primary Examiner*—Daniel H. Pan
*Attorney, Agent, or Firm*—Nixon & Vanderhye PC

[57] ABSTRACT

A digital signal processing system comprising a central processing unit core 2, a memory 8 and a coprocessor 4 operates using coprocessor memory access instructions (e.g. LDC, STC). The addressing mode information within these coprocessor memory access instructions (P, U, W, Offset) not only controls the addressing mode used by the central processing unit core 2 but is also used by the coprocessor 4 to determine the number of data words in the transfer being specified such that the coprocessor 4 can terminate the transfer at the appropriate time. Knowledge in advance of the number of words in a transfer is also advantageous in some bus systems, such as those that can be used with synchronous DRAM. The Offset field within the instruction may be used to specify changes to be made in the value provided by the central processing unit core 2 upon execution of a particular instruction and also to specify the number of words in the transfer. This arrangement is well suited to working through a regular array of data such as in digital signal processing operations. If the Offset field is not being used, then the number of words to be transferred may default to 1.

14 Claims, 9 Drawing Sheets

| | | | | | |
|---|---|---|---|---|---|
| | d5 | d4 | d3 | d2 | d1 | d0 |
| A0= | c5 | c4 | c3 | c2 | c1 | c0 |
| A1= | c4 | c3 | c2 | c1 | c0 | |
| A2= | c3 | c2 | c1 | c0 | | |
| A3= | c2 | c1 | c0 | | | |

Fig.7

COPROCESSOR DATA ACCESS CONTROL

BACKGROUND OF THE INVENTION

1. Field of the Invention

This invention relates to the field of data processing systems. More particularly, this invention relates to data processing systems incorporating a central processing unit, a memory and a coprocessor in which data words are transferred between the memory and the coprocessor under control of instructions executed jointly by the central processing unit and the coprocessor.

2. Description of the Prior Art

It is known to provide processing systems having a central processing unit, a memory and a coprocessor, such as the coprocessor equipped ARM microprocessors produced by Advanced RISC Machines Limited of Cambridge England. Within such known systems the central processing unit executes coprocessor memory access instructions (such as a coprocessor load or a coprocessor store) that serve to generate appropriate address data for supply to the memory and to prepare the coprocessor to exchange data words (units of data transfer) directly with the memory. Once the start address information has been provided by the central processing unit to the memory, then it is most efficient if the data words are passed directly to the coprocessor without having to be routed through or stored in the central processing unit. With such direct transfer to the coprocessor it is desirable that the coprocessor control the end of the data transfer so that different coprocessors with different numbers of words in each transfer can be attached to the central processing unit without having to modify the central processing unit. In order to control the end of the data transfer, the coprocessor must be able to determine how many data words are intended to be transferred in response to the instruction executing on the central processing unit.

One possibility would be to make each instruction executing on the central processing unit transfer only a single data word. This would be highly inefficient, both in terms of the use of data memory band width and also code side and instruction memory band width, and it is desirable to use burst mode transfers in which a start address is provided to the memory which then returns data words from a sequence of adjacent memory locations. With burst mode transfers the efficiency gains are accompanied by the difficulty that it is desirable that the coprocessor then determines how many data words are intended to be transferred so that it can exercise the necessary control to stop the transfer.

It is known (e.g. within the ARM floating point accelerator unit) to allocate a bit field within an instruction executing upon the central processing unit which is passed to the coprocessor and specifies to the coprocessor the number of data words to be transferred. However, the bit space available within the instructions executing on the central processing unit is limited and if bits within the instructions are dedicated to passing the number of data words to the coprocessor, then this restricts the bit space available for other fields within the instruction that may be used to specify other parameters relating to the data transfer, e.g. changes in the address pointer within the central processing unit to be made following the execution of the instruction.

SUMMARY OF THE INVENTION

It is an object of the present invention to address the above problems.

Viewed from one aspect the present invention provides apparatus for processing data comprising:

(i) a central processing unit for executing central processing unit instructions to perform data processing operations, said central processing unit instructions including coprocessor memory access instructions;

(ii) a memory coupled to said central processing unit for holding data words;

(iii) a coprocessor coupled to said central processing unit and said memory, data words within said memory to be processed by said coprocessor being addressed using one of a plurality of addressing modes under control of said coprocessor memory access instructions executed by said central processing unit;

(iv) wherein at least one coprocessor memory access instruction includes addressing mode information controlling which of said plurality of addressing modes is used by said central processing unit to access said memory, said coprocessor using at least a portion of said addressing mode information to control how many data words are transferred between said memory and said coprocessor in response to said at least one coprocessor memory access instruction.

The invention recognises that the bit fields (that may include register numbers and immediate constants) that are used by the central processing unit to control which of a plurality of addressing modes is used may also be used to specify (possibly in combination with other factors, such as other fields in the instruction or values written in control registers) to the coprocessor the number of data words to be transferred. For example, it has been found that in a large number of cases the bit field information that is used by the central processing unit to control the address used for the transfer and/or the change to an address pointer is (or may be) related to the number of data words to be transferred to the coprocessor and accordingly this bit field can be read by the coprocessor as well as by the central processing unit. The overlapping use of the same bit field within the coprocessor memory access instructions frees bit space within these coprocessor memory access instructions for other uses. Furthermore, it has been found that in a large majority of cases the number of data words to be transferred fall into a small number of categories and so the full flexibility of providing a dedicated bit field for the number of data words to be transferred to the coprocessor is outweighed by the improvements in code density and efficiency that are gained by employing the present invention.

Whilst the central processing unit can control the addressing in a number of different ways, in preferred embodiments of the invention said at least one coprocessor memory access instruction references a register within said central processing unit holding an address value and said address mode information includes an offset field, wherein a start address within said memory to be accessed is determined from at least one of said address value and said offset value upon execution of said at least one coprocessor memory access instruction.

Such use of an address pointer held within a register of the central processing unit provides a great deal of flexibility and in combination with the offset field within the instruction simplifies the coding of applications.

When it is desirable to work through an array of data with the coprocessor preferred embodiments of the invention are such that said change made to said address value yields a final address value that is optionally stored back into said register.

It has been found that it is highly convenient that at least a portion of said offset field is used by said coprocessor to control how many data words are transferred between said memory and said coprocessor.

Such an arrangement caters for a high proportion of the real life situations in which a coprocessor is used for performing data processing operations upon data held within a memory.

It is also advantageous that the addressing mode information should include one or more flags that control which of said plurality of addressing modes used and also control whether or not said offset field is to be used by said coprocessor in determining how many data words are transferred between said memory and said coprocessor.

The selective use of the offset field in dependence upon other flag bits within the addressing mode information increases the number of options available to the way in which the coprocessor may control the number of data words transferred and so making it possible to match the requirements of a higher proportion of real life situations whilst requiring no further bit space within the coprocessor memory access instructions.

It has been found to encompass a high proportion of desired types of operation that preferred embodiments should be ones in which when said offset field is not used by said coprocessor in determining how many data words are transferred between said memory and said coprocessor, a fixed number of words are transferred between said memory and said coprocessor.

A complementary set of coprocessor memory access instruction modes of controlling the coprocessor are such that said register stores an address value of Rn, a data word is WL bytes in length, and said offset value is M and said one or more flags comprise three or more value bits that select said at least one coprocessor memory access instruction to operate in accordance with one of:

|       | Transfer Start Address Value | Final Value in Address Register | Number of Data Words Transferred |
|-------|------------------------------|--------------------------------|----------------------------------|
| (i)   | Rn                           | Rn − (WL*M)                    | (fixed number)                   |
| (ii)  | Rn                           | Rn                             | M                                |
| (iii) | Rn                           | Rn + (WL*M)                    | M                                |
| (iv)  | Rn − (WL*M)                  | Rn                             | M                                |
| (v)   | Rn − (WL*M)                  | Rn − (WL*M)                    | M                                |
| (vi)  | Rn + (WL*M)                  | Rn                             | (fixed number)                   |
| (vii) | Rn + (WL*M)                  | Rn + (WL*M)                    | (fixed number)                   |

The coprocessor memory access instructions also advantageously include flags that comprise (i) a flag bit P that specifies whether said start address value is said address value originally stored in said register or an address value changed as specified by said offset field;

(ii) a flag bit U that specifies whether said change should be addition or subtraction of a value specified in said offset field from said address value originally stored in said register; and (iii) a flag bit W that specifies whether or not said final value in said address register should be stored back into said register.

With such a set of flags the coprocessor may be configured to provide rapid and simple control of its operation by providing logic such that said coprocessor evaluates P EOR U in order to determine whether one data word or M data words should be transferred.

An additional possibility is to make the number of words transferred 1 when the base register is the ARM program counter register (PC or R15). This would modify the logic for determining a single word transfer to P EOR (U or (base register is PC)).

Whilst the above discussed features of controlling the interaction of a coprocessor with a central processing unit and a memory may be employed in many different fields (e.g. floating point coprocessors) the comparative regularity of data access is such that the invention is particularly suited for embodiments in which said central processing unit and said coprocessor perform digital signal processing operations and said data words transferred between said memory and said coprocessor include coefficient values from within an array of coefficient values stored in said memory.

Viewed from another aspect the invention provides a method of processing data, said method comprising the steps of:

(i) executing central processing unit instructions with a central processing unit to perform data processing operations, said central processing unit instructions including coprocessor memory access instructions;

(ii) holding data words in a memory coupled to said central processing unit;

(iii) addressing data words within said memory to be processed by a coprocessor coupled to said central processing unit and said memory using one of a plurality of addressing modes under control of coprocessor memory access instructions executed by said central processing unit;

(iv) wherein at least one of said coprocessor memory access instructions includes addressing mode information controlling which of said plurality of addressing modes is used by said central processing unit to access said memory, said coprocessor using at least a portion of said addressing mode information to control how many data words are transferred between said memory and said coprocessor in response to said at least one of said coprocessor memory access instructions.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 is a table illustrating a Block Filter Algorithm;

DESCRIPTION OF THE PREFERRED EMBODIMENTS

In the following description Section One describes a system comprising a central processing unit, a memory and a coprocessor that is designed to provide high speed digital signal processing capabilities. Section Two describes a modification to the system of Section One in which the coprocessor memory access instructions have been modified to enhance the ease of control by the coprocessor of the number of data words transferred.

SECTION ONE

The system described below is concerned with digital signal processing (DSP). DSP can take many forms, but may typically be considered to be processing that requires the high speed (real time) processing of large volumes of data.

This data typically represents some analogue physical signal. A good example of DSP is that used in digital mobile telephones in which radio signals are received and transmitted that require decoding and encoding (typically using convolution, transform and correlation operations) to and from an analogue sound signal. Another example is disk driver controllers in which the signals recovered from the disk heads are processed to yield head tracking control.

In the context of the above, there follows a description of a digital signal processing system based upon a microprocessor core (in this case an ARM core from the range of microprocessors designed by Advanced RISC Machines Limited of Cambridge, United Kingdom) cooperating with a coprocessor. The interface of the microprocessor and the coprocessor and the coprocessor architecture itself are specifically configured to provide DSP functionality. The microprocessor core will be referred to as the ARM and the coprocessor as the Piccolo. The ARM and the Piccolo will typically be fabricated as a single integrated circuit that will often include other elements (e.g. on-chip DRAM, ROM, D to A and A to D convertors etc.) as part of an ASIC.

Piccolo is an ARM coprocessor, it therefore executes part of the ARM instruction set. The ARM coprocessor instructions allow ARM to transfer data between Piccolo and memory (using Load Coprocessor, LDC and Store Coprocessor, STC, instructions), and to transfer ARM registers to and from Piccolo (using move to coprocessor, MCR, and move from coprocessor, MRC, instructions). One way of viewing the synergistic interaction of the ARM and Piccolo is that ARM acts as a powerful address generator for Piccolo data, with Piccolo being left free to perform DSP operations requiring the real time handling of large volumes of data to produce corresponding real time results.

Figure 1:
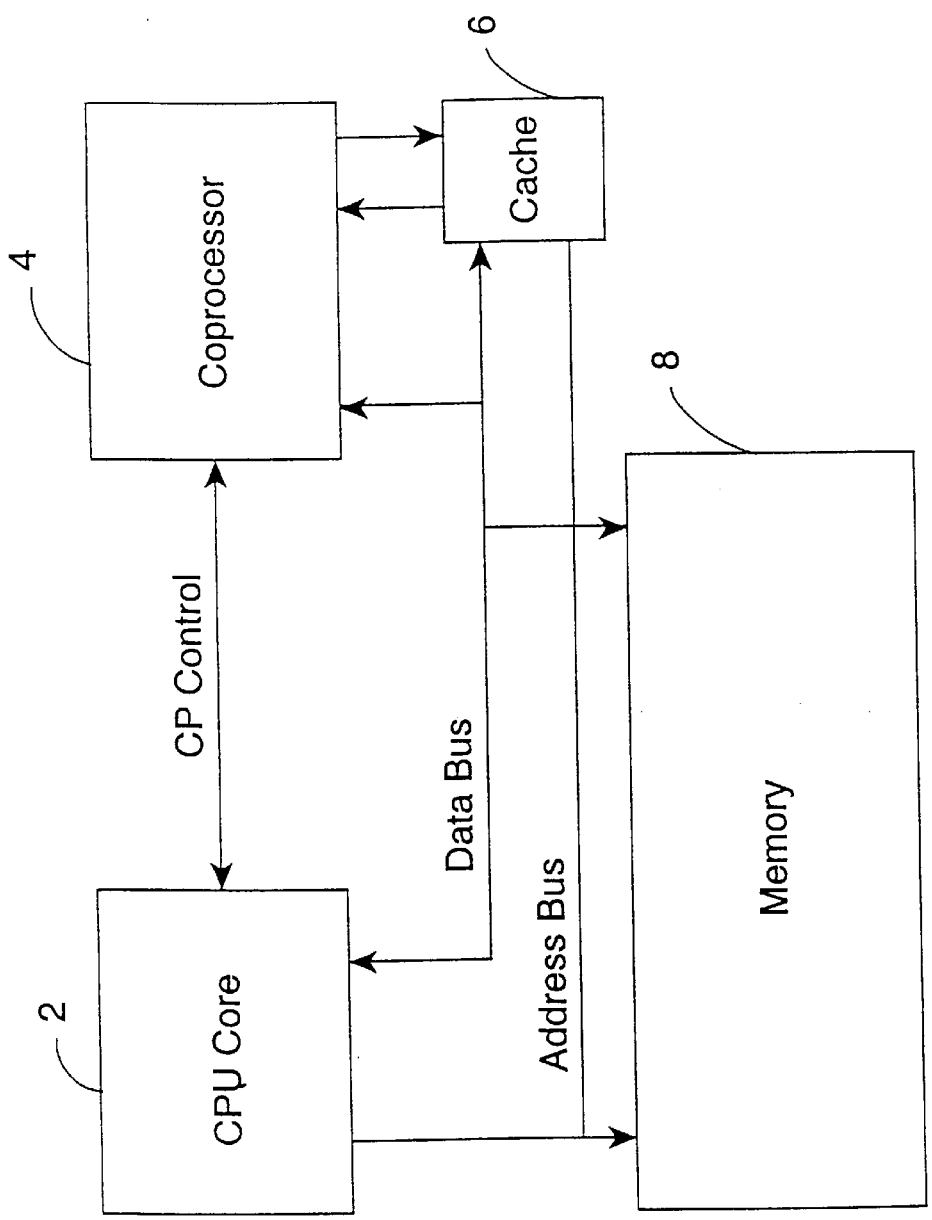
FIG. 1 illustrates the high level configuration of a digital signal processing apparatus.

FIG. 1 illustrates the ARM 2 and Piccolo 4 with the ARM 2 issuing control signals to the Piccolo 4 to control the transfer of data words to and from Piccolo 4. An instruction cache 6 stores the Piccolo program instruction words that are required by Piccolo 4. A single DRAM memory 8 (alternatively this could be SRAM or memory of another form) stores all the data and instruction words required by both the ARM 2 and Piccolo 4. The ARM 2 is responsible for addressing the memory 8 and controlling all data transfers. The arrangement with only a single memory 8 and one set of data and address buses is less complex and expensive than the typical DSP approach that requires multiple memories and buses with high bus bandwidths.

Figure 2:
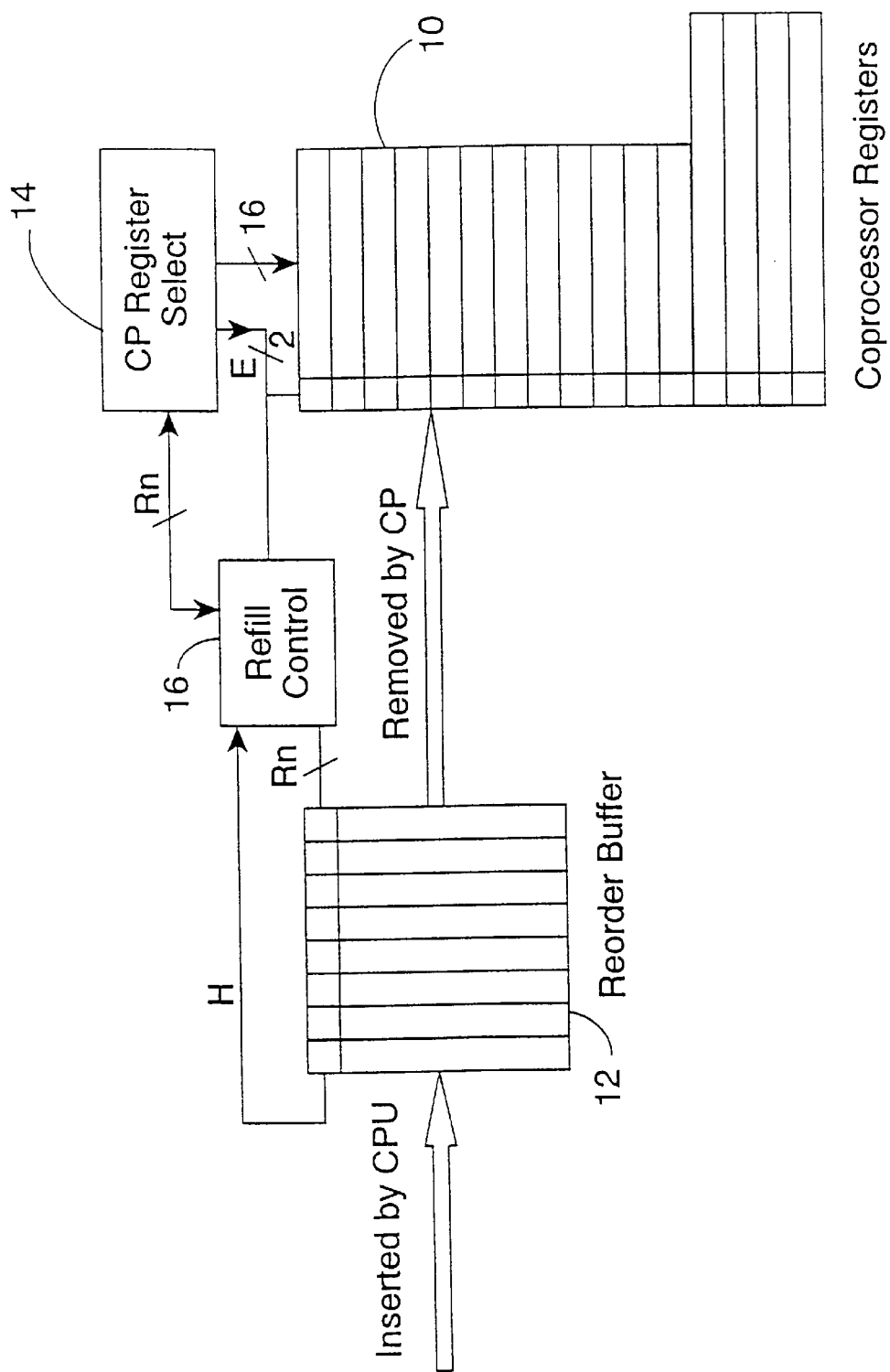
FIG. 2 illustrates the input buffer and register configuration of a coprocessor.

Piccolo executes a second instruction stream (the digital signal processing program instruction words) from the instruction cache 6, which controls the Piccolo datapath. These instructions include digital signal processing type operations, for example Multiply-Accumulate, and control flow instructions, for example zero overhead loop instructions. These instructions operate on data which is held in Piccolo registers 10 (see FIG. 2). This data was earlier transferred from memory 8 by the ARM 2. The instructions are streamed from the instruction cache 6; the instruction cache 6 drives the data bus as a full bus master. A small Piccolo instruction cache 6 will be a 4 line, 16 words per line direct mapped cache (64 instructions). In some implementations, it may be worthwhile to make the instruction cache bigger or more associative.

Thus two tasks are run independently—ARM loading data, and Piccolo processing it. This allows sustained single cycle data processing on 16 bit data. Piccolo has a data input mechanism (illustrated in FIG. 2) that allows the ARM to prefetch sequential data, loading the data before it is required by Piccolo. Piccolo can access the loaded data in any order, automatically refilling its register as the old data is used for the last time (most instructions have one bit per source operand to indicate that the source register should be refilled). This input mechanism is termed the reorder buffer and comprises an input buffer 12. Every value loaded into Piccolo (via an LDC or MCR see below) carries with it a tag Rn specifying which register the value is destined for. The tag Rn is stored alongside the data word in the input buffer. When a register is accessed via a register selecting circuit 14 and the instruction specifies the data register is to be refilled, the register is marked as empty by asserting a signal E. The register is then automatically refilled by a refill control circuit 16 using the oldest loaded value destined for that register within the input buffer 12. The reorder buffer holds 8 tagged values. The input buffer 12 has a form similar to a FIFO except that data words can be extracted from the centre of the queue after which later stored words will be passed along to fill the space. Accordingly, the data words furthest from the input are the oldest and this can be used to decide which data word should be used to refill a register when the input buffer 12 holds two data words with the correct tag Rn.

Figure 3:
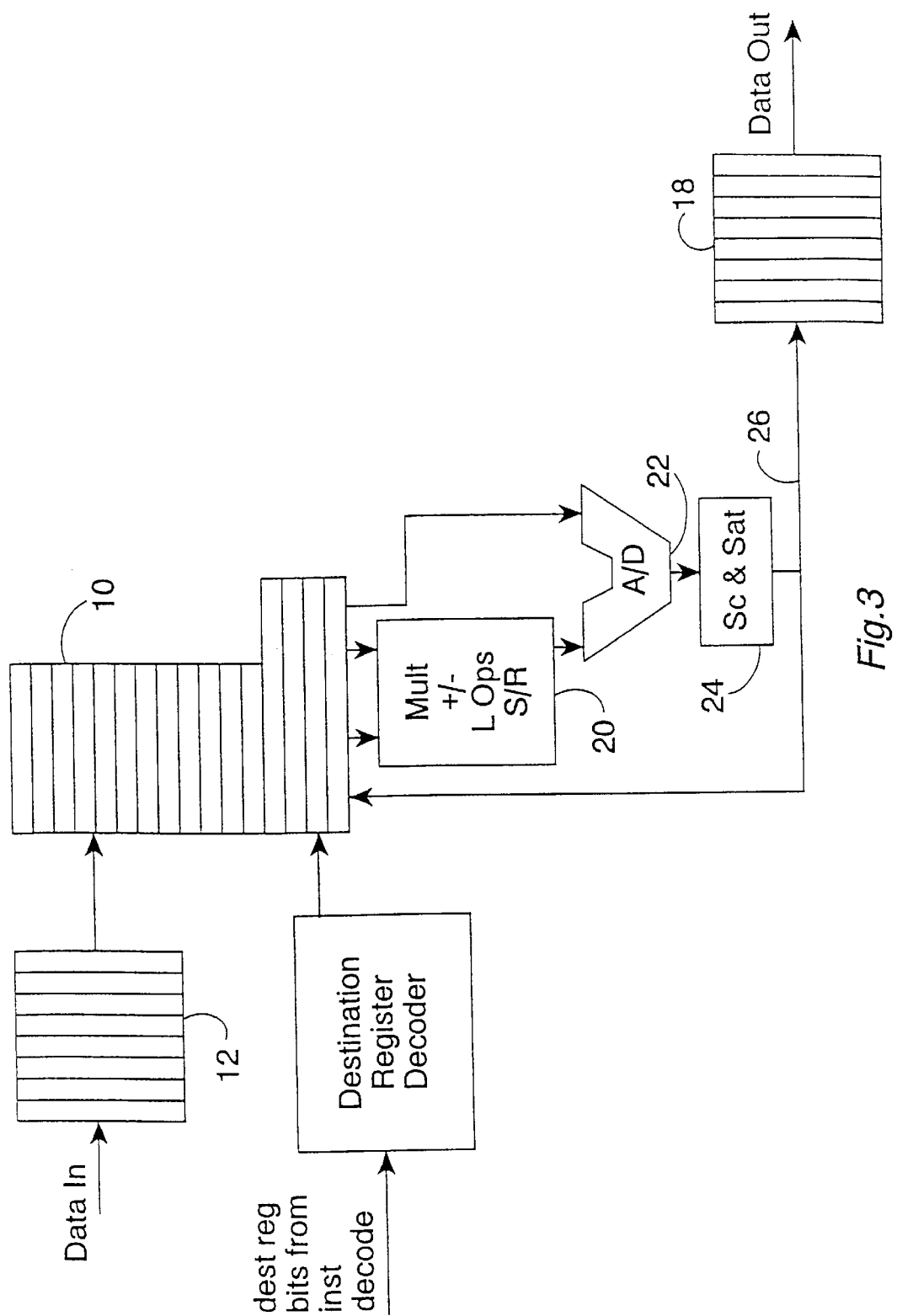
FIG. 3 illustrates the datapath through the coprocessor.

Piccolo outputs data by storing it in an output buffer 18 (FIFO) as shown in FIG. 3. Data is written to the FIFO sequentially, and read out to memory 8 in the same order by ARM. The output buffer 18 holds 8 32 bit values.

Piccolo connects to ARM via the coprocessor interface (CP Control signals of FIG. 1). On execution of an ARM coprocessor instruction Piccolo can either execute the instruction, cause the ARM to wait until Piccolo is ready before executing the instruction or refuse to execute the instruction. In the last case ARM will take an undefined instruction exception.

The most common coprocessor instructions that Piccolo will execute are LDC and STC, which respectively load and store data words to and from the memory 8 via the data bus, with ARM generating all addresses. It is these instructions which load data into the reorder buffer 12, and store data from the output buffer 18. Piccolo will stall the ARM on an LDC if there is not enough room in the input reorder buffer to load in the data and on an STC if there is insufficient data in the output buffer to store, i.e. the data the ARM is expecting is not in the output buffer 18. Piccolo also executes ARM/Coprocessor register transfers to allow ARM to access Piccolo's special registers.

Piccolo fetches its own instructions from memory to control the Piccolo datapath illustrated in FIG. 3 and to transfer data from the reorder buffer to registers and from registers to the output buffer 18. The arithmetic logic unit of the Piccolo that executes these instructions has a multiplier/adder circuit 20 and an accumulate/decumulate circuit 22 that cooperate to perform multiplies, adds, subtracts, multiple-accumulates, logical operations, shifts and rotates. There is also provided in the datapath a scale/saturate circuit 24.

The Piccolo instructions are initially loaded from memory into the instruction cache 6, where Piccolo can access them without needing access back to the main memory.

Piccolo cannot recover from memory aborts. Therefore if Piccolo is used in a virtual memory system, all Piccolo data must be in physical memory throughout the Piccolo task. This is not a significant limitation given the real time nature of Piccolo tasks, e.g. real time DSP.

FIG. 3 shows the overall datapath functionality of Piccolo. The register bank 10 uses 3 read ports and 2 write ports. One write port (the L port) is used to refill registers from the reorder buffer. The output buffer 18 is updated directly from the ALU result bus 26, output from the output buffer 18 is under ARM program control. The ARM coprocessor interface performs LDC (Load Coprocessor) instructions into the reorder buffer, and STC (Store Coprocessor) instructions from the output buffer 18, as well as MCR and MRC (Move ARM register to/from CP register) in the register bank 10 via the reorder buffer 12 and the output buffer 18.

The remaining register ports are used for the ALU. Two read ports (A and B) drive the inputs to the multiplier/adder circuit 20, the C read port is used to drive the accumulator/decumulator circuit 22 input. The remaining write port W is used to return results to the register bank 10.

The multiplier 20 performs a 16×16 signed multiply, with the accumulator/decumulator circuit 22 performing an optional 40 bit accumulate. The scaler unit 24 can provide a 0 to 31 immediate arithmetic or logical shift right, followed by an optional saturate. The multiplier 20 can also alternatively perform either a shift or a logical operation every cycle.

Piccolo has 16 general purpose registers named D0–D15 or A0–A3, X0–X3, Y0–Y3, Z0–Z3. The first four registers (A0–A3) are intended as accumulators and are 40 bits wide, the extra 16 bits providing a guard against overflow during many successive calculations. The remaining registers are 32 bits wide.

Each of Piccolo's registers can be treated as containing two independent 16 bit values. Bits 0 to 15 contain the low half, bits 16 to 31 contain the high half. Instructions can specify a particular 16 bit half of each register as a source operand, or they may specify the entire 32 bit register.

Piccolo also provides for saturated arithmetic. Variants of the multiply, add and subtract instructions provide a saturated result if the result is greater than the size of the destination register. Where the destination register is a 40 bit accumulator, the value is saturated to 32 bits (i.e. there is no way to saturate a 40 bit value). There is no overflow detection on 40 bit registers. This is a reasonable restriction since it would take at least 65536 multiply accumulate instructions to cause an overflow.

Each Piccolo register (or half a Piccolo register) is either marked as "empty" (E flags, see FIG. 2) or contains a value. Initially, all registers are marked as empty. On each cycle Piccolo attempts with the refill control circuit 16 to fill one of the empty registers by a value from the input reorder buffer. Alternatively if the register is written with a value from the ALU it is no longer marked as "empty". If a register is written from the ALU and at the same time there is a value waiting to be placed in the register from the reorder buffer, then the two register writes may be done in either order at the hardware implementor's option and a programmer cannot rely upon the final contents of the register in this case. Piccolo's execution unit will stall if a read is made to an empty register.

The Input Reorder Buffer (ROB) sits between the coprocessor interface and Piccolo's register bank. Data is loaded into the ROB with ARM coprocessor transfers. The ROB contains a number of 32-bit values, each with a tag indicating the Piccolo register that the value is destined for. The tag also indicates whether the data should be transferred to a whole 32-bit register or just to the bottom 16-bits of a 32-bit register. If the data is destined for a whole register, the bottom 16 bits of the entry will be transferred to the bottom half of the target register and the top 16 bits will be transferred to the top half of the register (sign extended if the target register is a 40-bit accumulator). If the data is destined for just the bottom half of a register (so called 'Half Register'), the bottom 16 bits will be transferred first.

The register tag always refers to a physical destination register, no register remapping is performed (see below regarding register remapping).

On every cycle Piccolo attempts to transfer a data entry from the ROB to the register bank as follows:

Each entry in the ROB is examined and the tags compared with the registers that are empty, it is determined whether a transfer can be made from part or all of an entry to a register.

From the set of entries that can make a transfer, the oldest entry is selected and its data transferred to the register bank.

The tag of this entry is updated to mark the entry as empty. If only part of the entry was transferred, only the part transferred is marked empty.

For example, if the target register is completely empty and the selected ROB entry contains data destined for a full register, the whole 32 bits are transferred and the entry is marked empty. If the bottom half of the target register is empty and the ROB entry contains data destined for the bottom half of a register, the bottom 16 bits of the ROB entry are transferred to the bottom half of the target register and the bottom half of the ROB is marked as empty.

The high and low 16-bits of data in any entry can be transferred independently. If no entry contains data that can be transferred to the register bank, no transfer is made that cycle. The table below describes all possible combinations of target ROB entry and target register status.

| | Target, Rn, Status | | |
|---|---|---|---|
| Target ROB entry status | empty | low half empty | high half empty |
| Full Register, both halves valid | Rn.h <- entry.h<br>Rn.1 <- entry.1<br>entry marked empty | Rn.1 <- entry.1<br>entry.1 marked empty | Rn.h <- entry.h<br>entry.h marked empty |
| Full Register, high half valid | Rn.h <- entry.h<br>entry marked empty | | Rn.h <- entry.h<br>entry marked empty |
| Full Register, low half valid | Rn.1 <- entry.1<br>entry marked empty | Rn.1 <- entry.1<br>entry marked empty | |
| Half Register, both halves valid | Rn.1 <- entry.1<br>entry.1 marked empty | Rn.1 <- entry.1<br>entry.1 marked empty | |
| Half Register, high half valid | Rn.1 <- entry.h<br>entry marked empty | Rn.1 <- entry.h<br>entry marked empty | |

To summarise, the two halves of a register may be refilled independently from the ROB. The data in the ROB is either marked as destined for a whole register or as two 16-bit values destined for the bottom half of a register.

Data is loaded into the ROB using ARM coprocessor instructions. How the data is marked in the ROB depends on which ARM coprocessor instruction was used to perform the transfer. The following ARM instructions are available for filling the ROB with data:

| | |
|---|---|
| LDP{<cond>}<16/32> | <dest>, [Rn]{!]}, #<size> |
| LDP{<cond>}<16/32>W | <dest>, <wrap>, [Rn]{!}, #<size> |
| LDP{<cond>}16U | <bank>, [Rn]{!} |
| MPR{<cond>} | <dest>, Rn |
| MPRW{<cond>} | <dest>, Rn |

The following ARM instruction is provided for configuring the ROB:

LDPA <bank list>

The first three are assembled as LDCs, MPR and MRP as MCRs, LDPA is assembled as a CDP instruction.

Figure 5:
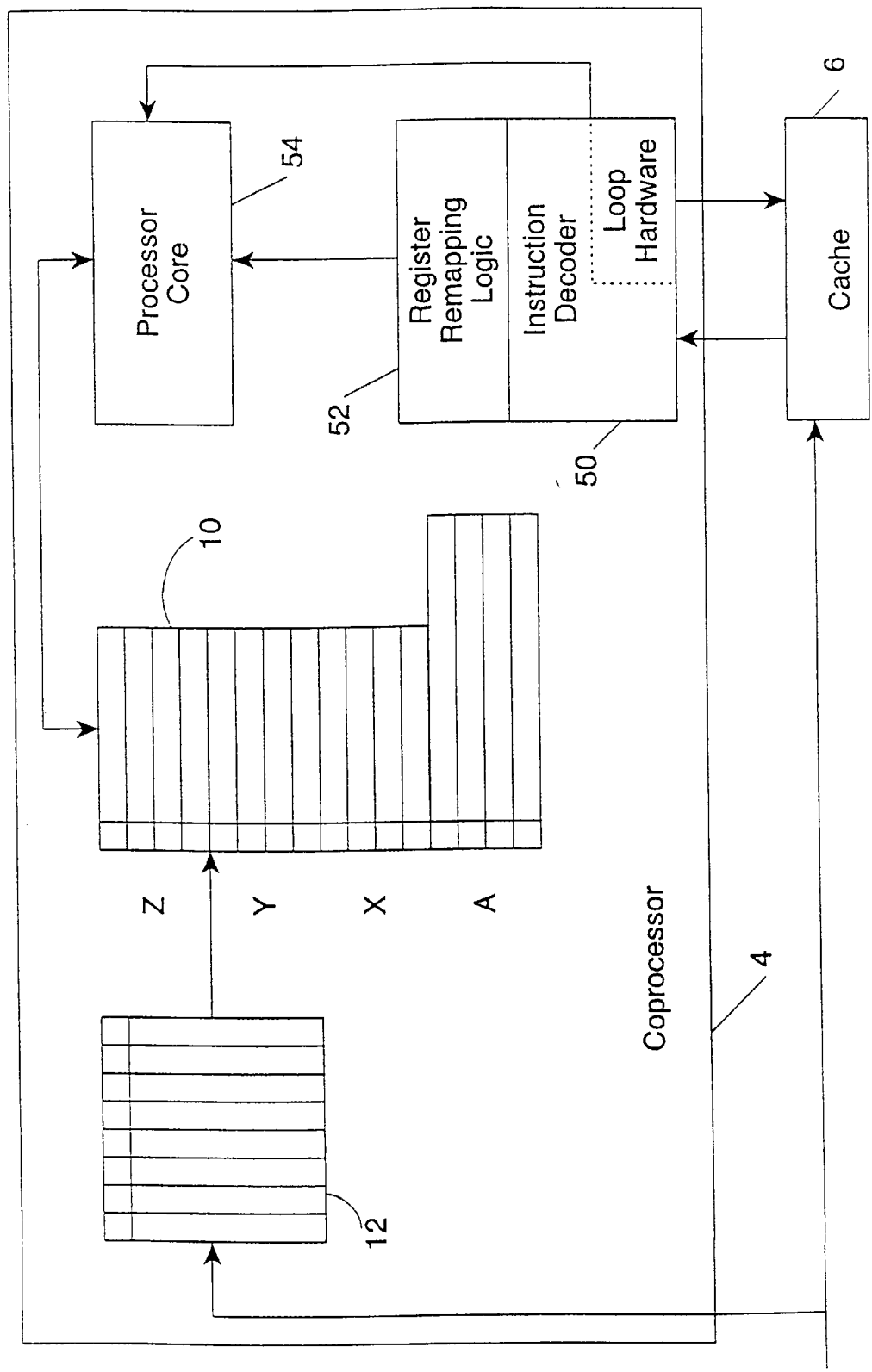
FIG. 5 is a block diagram illustrating register remapping logic used by the coprocessor in preferred embodiments.

In the above <dest> stands for a Piccolo register (A0–Z3), Rn for an ARM register, <size> for a constant number of bytes which must be a non zero multiple of 4, <wrap> for a constant (1,2,4,8) <cond> for conditional execution specifying bits and <bank> for one of the groups of registers A,X,Y and Z illustrated in FIG. 5. Fields surrounded by { } are optional. For a transfer to be able to fit into the Reorder Buffer, <size> must be at most 32. In many circumstances <size> will be smaller than this limit to avoid deadlock. The <16/32> field indicates whether the data being loaded should be treated as 16-bit data, and endianess specific action taken (see below), or as 32-bit data.

Note1: In the following text, when referring to LDP or LDPW this refers to both the 16-bit and 32-bit variants of the instructions.

Note2: A 'word' is a 32-bit chunk from memory, which may consist of two 16-bit data items or one 32-bit data item.

The LDP instruction transfers a number of data items, marking them as destined for a full register. The instruction will load <size>/4 words from address Rn in memory, inserting them into the ROB. The number of words that can be transferred is limited by the following:

The quantity <size> must be a non-zero multiple of 4 bytes;

<size> must be less than or equal to the size of the ROB for a particular implementation (8 words in the first version, and guaranteed to be no less than this in future versions).

The first data item transferred will be tagged as destined for <dest>, the second as destined for <dest>+1 and so on (with wrapping from Z3 to A0). If the ! is specified then the register Rn is incremented by <size> afterwards.

If the LDP16 variant is used, endian specific action is performed on the two 16-bit halfwords forming the 32-bit data items as they are returned from the memory system. See below for more details on Big Endian and Little Endian Support.

The LDPW instruction transfers a number of data items to a set of registers. The first data item transferred is tagged as destined for <dest>, the next for <dest>+1, etc. When <wrap> transfers have occurred, the next item transferred is tagged as destined for <dest>, and so on. The <wrap> quantity is specified in halfword quantities.

For LDPW, the following restrictions apply:

The quantity <size> must be a non-zero multiple of 4 bytes;

<size> must be less than or equal to the size of the ROB for a particular implementation (8 words in the first version, and guaranteed to be no less than this in future versions);

<dest> may be one of {A0, X0, Y0, Z0};

<wrap> may be one of {2,4,8} halfwords for LDP32W and one of {1,2,4,8} halfwords for LDP16W;

The quantity <size> must be greater than 2*<wrap>, otherwise no wrapping occurs and the LDP instruction shall be used instead.

For example, the instruction,

| LDP32W | X0, 2, [R0]!, #8 |
|---|---| will load two words into the ROB, marking them as destined for the full register X0. R0 will be incremented by 8. The instruction,

| LDP32W | X0, 4, [R0], #16 |
|---|---| will load four words into the ROB, marking them as destined for X0, X1, X0, X1 (in that order). R0 will not be affected.

For LDP16W, <wrap> may be specified as 1,2,4 or 8. The wrap of 1 will cause all data to be tagged as destined for the bottom half of the destination register <dest>.1. This is the 'Half Register' case.

For example the instruction,

| LDP16W | X0, 1, [R0]!, #8 |
|---|---| will load two words into the ROB, marking them as 16-bit data destined for X0.1. R0 will be incremented by 8. The instruction,

| LDP16W | X0, 4, [R0], #16 |
|---|---| will behave in a similar fashion to the LDP32W examples, except for the fact that endian specific action may be performed on the data as it is returned from memory.

All unused encodings of the LDP instruction may be reserved for future expansion.

The LDP16U instruction is provided to support the efficient transfer of non-word aligned 16-bit data. LDP16U support is provided for registers D4 to D15 (the X, Y and Z banks). The LDP16U instruction will transfer one 32-bit word of data (containing two 16-bit data items) from memory into Piccolo. Piccolo will discard the bottom 16 bits of this data and store the top 16 bits in a holding register. There is a holding register for the X, Y and Z banks. Once the holding register of a bank is primed, the behaviour of LDP{W} instructions is modified if the data is destined for a register in that bank. The data loaded into the ROB is formed by the concatenation of the holding register and the bottom 16 bits of data being transferred by the LDP instruction. The upper 16 bits of data being transferred is put into the holding register:

entry←data.1 | holding_register holding_register←data.h

This mode of operation is persistent until it is turned off by a LDPA instruction. The holding register does not record the destination register tag or size. These characteristics are obtained from the instruction that provides the next value of data.1.

Endian specific behaviour may always occur on the data returned by the memory system. There is no non 16-bit equivalent to LDP16U since it is assumed that all 32-bit data items will be word aligned in memory.

The LDPA instruction is used to switch off the unaligned mode of operation initiated by a LDP16U instruction. The unaligned mode may be turned off independently on banks X, Y, Z. For example the instruction,

| LDPA | {X, Y} |
|---|---| will turn off the unaligned mode on banks X and Y. Data in the holding registers of these banks will be discarded.

Executing an LDPA on a bank which is not in unaligned mode is allowed, and will leave that bank in aligned mode.

The MPR instruction places the contents of ARM register Rn into the ROB, destined for Piccolo register <dest>. The destination register <dest> may be any full register in the range A0–Z3. For example the instruction,

| MPR | X0, R3 |
|---|---| will transfer the contents of R3 into the ROB, marking the data as destined for the full register X0.

No endianess specific behaviour occurs to the data as it is transferred from ARM to Piccolo since the ARM is internally little endian.

The MPRW instruction places the contents of ARM register Rn into the ROB, marking it as two 16-bit data items destined for the 16-bit Piccolo register <dest>.1. The restrictions on <dest> are the same as those for the LDPW instructions (i.e. A0,X0,Y0,Z0). For example the instruction,

| MPRW | X0, R3 |
|---|---| will transfer the contents of R3 into the ROB, marking the data as 2 16-bit quantities destined for X0.1. It should be noted that as for the LDP16W case with a wrap of 1, only the bottom half of a 32-bit register can be targeted.

As with MPR no endianess specific operations are applied to the data.

LDP is encoded as:

| 31 30 29 28 | 27 26 25 | 24 | 23 | 22 | 21 | 20 | 19 18 17 16 | 15 14 13 12 | 11 10 9 8 | 7 6 5 4 3 2 1 0 |
|---|---|---|---|---|---|---|---|---|---|---|
| COND | 110 | P | U | N | W | 1 | Rn | DEST | PICCOLO1 | SIZE/4 | where PICCOLO1 is Piccolo's first coprocessor number (currently 8). The N bit selects between LDP32 (1) and LDP16 (0). P, U and W are bits that are described further later in the description and also in published datasheets relating to the ARM central processing unit.

LDPW is encoded as:

| 31 30 29 28 | 27 26 25 | 24 | 23 | 22 | 21 | 20 | 19 18 17 16 | 15 14 13 12 | 11 10 9 8 | 7 6 5 4 3 2 1 0 |
|---|---|---|---|---|---|---|---|---|---|---|
| COND | 110 | P | U | N | W | 1 | Rn | DEST | WRAP | PICCOLO2 | SIZE/4 | where DEST is 0–3 for destination register A0,X0,Y0,Z0 and WRAP is 0–3 for wrap values 1,2,4,8. PICCOLO2 is Piccolo's second coprocessor number (currently 9). The N bit selects between LDP32 (1) and LDP16 (0).

LDP16U is encoded as:

| 31 30 29 28 | 27 26 25 | 24 | 23 | 22 | 21 | 20 | 19 18 17 16 | 15 14 13 12 | 11 10 | 9 8 | 7 6 5 4 3 2 1 0 |
|---|---|---|---|---|---|---|---|---|---|---|---|
| COND | 110 | P | U | 0 | W | 1 | Rn | DEST | 01 | PICCOLO2 | 00000001 | where DEST is 1–3 for the destination bank X, Y, Z.

LDPA is encoded as:

| 31 30 29 28 | 27 26 25 24 | 23 22 21 20 | 19 18 17 16 | 15 14 13 12 | 11 10 9 8 | 7 6 5 4 | 3 | 2 1 0 |
|---|---|---|---|---|---|---|---|---|
| COND | 1110 | 0000 | 0000 | 0000 | PICCOLO1 | 000 | 0 | BANK | where BANK[3:0] is used to turn off the unaligned mode on a per bank basis. If BANK[1] is set, unaligned mode on bank X is turned off. BANK[2] and BANK[3] turn off unaligned mode on banks Y and Z if set, respectively. BANK[0] corresponds to the bank A, but this does not support unaligned mode. N.B. This is a CDP operation.

MPR is encoded as:

| 31 30 29 28 | 27 26 25 24 | 23 | 22 | 21 | 20 | 19 18 17 16 | 15 14 13 12 | 11 10 9 8 | 7 6 5 | 4 | 3 2 1 0 |
|---|---|---|---|---|---|---|---|---|---|---|---|
| COND | 1110 | 0 | 1 | 0 | 0 | DEST | Rn | PICCOLO1 | 000 | 1 | 0000 |

MPRW is encoded as:

| 31 30 29 28 | 27 26 25 24 | 23 | 22 | 21 | 20 | 19 18 | 17 16 | 15 14 13 12 | 11 10 9 8 | 7 6 5 | 4 | 3 2 1 0 |
|---|---|---|---|---|---|---|---|---|---|---|---|---|
| COND | 1110 | 0 | 1 | 0 | 0 | DEST | 00 | Rn | PICCOLO2 | 000 | 1 | 0000 | where DEST is 1–3 for the destination register X0,Y0,Z0.

The output FIFO can hold up to eight 32-bit values. These are transferred from Piccolo by using one of the following (ARM) opcodes:

| STP{<cond>}<16/32> | [Rn]{!}, #<size> |
|---|---|
| MRP | Rn |

The first saves <size>/4 words from the output FIFO to the address given by the ARM register Rn, indexing Rn if the ! is present. To prevent deadlock, <size> must not be greater than the size of the output FIFO (8 entries in the this implementation). If the STP16 variant is used, endian specific behaviour may occur to the data returned to the memory system.

The MRP instruction removes one word from the output FIFO and places it in ARM register Rn. As with MPR no endian specific operations are applied to the data.

The ARM encoding for STP is:

| 31 30 29 28 | 27 26 25 | 24 | 23 | 22 | 21 | 20 | 19 18 17 16 | 15 14 13 12 | 11 10 9 8 | 7 6 5 4 3 2 1 0 |
|---|---|---|---|---|---|---|---|---|---|---|
| COND | 110 | P | U | N | W | 0 | Rn | 0000 | PICCOLO1 | SIZE/4 | where N selects between STP32 (1) and STP16 (0). For the definitions of the P, U and W bits, refer to an ARM data sheet or see later.

The ARM encoding for MRP is:

| 31 30 29 28 | 27 26 25 24 | 23 | 22 | 21 | 20 | 19 18 17 16 | 15 14 13 12 | 11 10 9 8 | 7 6 5 | 4 | 3 2 1 0 |
|---|---|---|---|---|---|---|---|---|---|---|---|
| COND | 1110 | 0 | 1 | 0 | 1 | 0000 | Rn | PICCOLO1 | 000 | 1 | 0000 |

The Piccolo instruction set assumes little endian operation internally. For example when accessing a 32-bit register as 16 bits halves, the lower half is assumed to occupy bits 15 to 0. Piccolo may be operating in a system with big endian memory or peripherals and must therefore take care to load 16-bit packed data in the correct manner.

Piccolo (i.e. the DSP adapted coprocessor), like the ARM (e.g. the ARM7 microprocessors produced by Advanced RISC Machines Limited of Cambridge, United Kingdom), has a 'BIGEND' configuration pin which the programmer can control, perhaps with a programmable peripheral. Piccolo uses this pin to configure the input reorder buffer and output FIFO.

When the ARM loads packed 16-bit data into the reorder buffer it must indicate this by using the 16-bit form of the LDP instruction. This information is combined with the state of the 'BIGEND' configuration input to place data into the holding latches and reorder buffer in the appropriate order. In particular when in big endian mode the holding register stores the bottom 16 bits of the loaded word, and is paired up with the top 16 bits of the next load. The holding register contents always end up in the bottom 16 bits of the word transferred into the reorder buffer.

The output FIFO may contain either packed 16-bit or 32-bit data. The programmer must use the correct form of the STP instruction so that Piccolo can ensure that the 16-bit data is provided on the correct halves of the data bus. When configured as big endian the top and bottom 16-bit halves are swapped when the 16-bit forms of STP are used.

Piccolo has 3 private registers which can only be accessed from the ARM. They are called S0–S2. They can only be accessed with MRC and MCR instructions. The opcodes are:

| MPSR | Sn, Rm |
|---|---|
| MRPS | Rm, Sn |

These opcodes transfer a 32-bit value between ARM register Rm and private register Sn. They are encoded in ARM as a coprocessor register transfer:

| 31 30 29 28 | 27 26 25 24 | 23 22 21 20 | 19 | 18 17 16 15 | 14 13 12 | 11 10 9 8 | 7 6 5 4 | 3 | 2 1 0 |
|---|---|---|---|---|---|---|---|---|---|
| COND | 1110 | 001 | L | Sn | Rm | PICCOLO | 000 | 1 | 0000 | where L is 0 for the MPSR and 1 for the MRPS.

Register S0 contains the Piccolo unique ID and revision code

| 31 30 29 28 27 26 25 24 | 23 22 21 20 19 18 17 16 | 15 14 13 12 11 10 9 8 7 6 5 4 | 3 2 1 0 |
|---|---|---|---|
| Implementor | Architecture | Part Number | Revision |

Bits[3:0] contain the revision number for the processor.

Bits[15:4] contain a 3 digit part number in binary coded decimal format: 0×500 for Piccolo Bits[23:16] contain the architecture version: 0×00=Version 1

Bits[31:24] contain the ASCII code of an implementers trademark: 0×41=A=ARM Ltd

Register S1 is the Piccolo status register.

| 31 | 30 | 29 | 28 | 27 | 26 | 25 | 24 | 23 22 21 20 19 18 17 16 15 14 13 12 11 10 9 8 7 6 | 5 | 4 | 3 | 2 | 1 | 0 |
|---|---|---|---|---|---|---|---|---|---|---|---|---|---|---|
| N | Z | C | V | SN | SZ | SC | SV | Reserved | D | A | H | B | U | E |

Primary condition code flags (N,Z,C,V)

Secondary condition code flags (SN,SZ,SC,SV)

E bit: Piccolo has been disabled by the ARM and has halted.

U bit: Piccolo encountered an UNDEFINED instruction and has halted.

B bit: Piccolo encountered a BREAKPOINT and has halted.

H bit: Piccolo encountered a HALT instruction and has halted.

A bit: Piccolo suffered a memory abort (load, store or Piccolo instruction) and has halted.

D bit: Piccolo has detected a deadlock condition and has halted (see below).

Register S2 is the Piccolo program counter:

| 31 30 29 28 27 26 25 24 23 22 21 20 19 18 17 16 15 14 13 12 11 10 9 8 7 6 5 4 3 2 | 1 0 |
|---|---|
| Program Counter | 0 0 |

Writing to the program counter will start Piccolo executing a program at that address (leaving halted state if it is halted). On reset the program counter is undefined, since Piccolo is always started by writing to the program counter.

During execution Piccolo monitors the execution of instructions and the status of the coprocessor interface. If it detects that:

Piccolo has stalled waiting for either a register to be refilled or the output FIFO to have an available entry.

The coprocessor interface is busy-waiting, because of insufficient space in the ROB or insufficient items in the output FIFO.

If both of these conditions are detected Piccolo sets the D-bit in its status register, halts and rejects the ARM coprocessor instruction, causing ARM to take the undefined instruction trap.

This detection of deadlock conditions allows a system to be constructed which can at least warn the programmer that the condition has occurred and report the exact point of failure, by reading the ARM and Piccolo program counters and registers. It should be stressed that deadlock can only happen due to an incorrect program or perhaps another part of the system corrupting Piccolo's state. Deadlock can not occur due to data starvation or 'overload'.

There are several operations available that may be used to control Piccolo from the ARM, these are provided by CDP instructions. These CDP instructions will only be accepted when the ARM is in a privileged state. If this is not the case Piccolo will reject the CDP instruction resulting in the ARM taking the undefined instruction trap. The following operations are available:

_Enter State Access Mode
_Enable
_Disable

Piccolo may be reset in software by using the PRESET instruction.

| PRESET | ; Clear Piccolo's state |
|---|---|

This instruction is encoded as:

| 31 30 29 28 | 27 26 25 24 | 23 22 21 20 | 19 18 17 16 | 15 14 13 12 | 11 10 9 8 | 7 6 5 4 | 3 | 2 1 0 |
|---|---|---|---|---|---|---|---|---|
| COND | 1110 | 0000 | 0000 | 0000 | PICCOLO1 | 000 | 0 | 0000 |

When this instruction is executed the following occurs:
All registers are marked as empty (ready for refill).
Input ROB is cleared.
Output FIFO is cleared.
Loop counters are reset.
Piccolo is put into halted state (and H bit of S1 will be set).

Executing the PRESET instruction may take several cycles to complete (2–3 for this embodiment). Whilst it is executing, following ARM coprocessor instructions to be executed on Piccolo will be busy waited.

In state access mode, Piccolo's state may be saved and restored using STC and LDC instructions (see the below regarding accessing Piccolo state from ARM). To enter state access mode, the PSTATE instruction must first be executed:

| PSTATE; | Enter State Access Mode |
|---|---|

This instruction is encoded as:

| 31 30 29 28 | 27 26 25 24 | 23 22 21 20 | 19 18 17 16 | 15 14 13 12 | 11 10 9 8 | 7 6 5 4 | 3 | 2 1 0 |
|---|---|---|---|---|---|---|---|---|
| COND | 1110 | 0001 | 0000 | 0000 | PICCOLO1 | 000 | 0 | 0000 |

When executed, the PSTATE instruction will:
Halt Piccolo (if it is not already halted), setting the E bit in Piccolo's Status Register.
Configure Piccolo into its State Access Mode.

Executing the PSTATE instruction may take several cycles to complete, as Piccolo's instruction pipeline must drain before it can halt. Whilst it is executing, following ARM coprocessor instructions to be executed on Piccolo will be busy waited.

The PENABLE and PDISABLE instructions are used for fast context switching. When Piccolo is disabled, only private registers 0 and 1 (the ID and Status registers) are accessible, and only then from a privileged mode. Access to any other state, or any access from user mode will cause an ARM undefined instruction exception. Disabling Piccolo causes it to halt execution, i.e. become unresponsive except to those instructions reading the private registers 0 and 1 and the PENABLE instruction. When Piccolo has halted execution, it will acknowledge the fact by setting the E bit in the status register.

Piccolo is enabled by executing the PENABLE instruction:

| PENABLE; | Enable Piccolo |
|---|---|

This instruction is encoded as:

| 31 30 29 28 | 27 26 25 24 | 23 22 21 20 | 19 18 17 16 | 15 14 13 12 | 11 10 9 8 | 7 6 5 4 | 3 | 2 1 0 |
|---|---|---|---|---|---|---|---|---|
| COND | 1110 | 0010 | 0000 | 0000 | PICCOLO1 | 000 | 0 | 0000 |

Piccolo is disabled by executing the PDISABLE instruction:

| PDISABLE | ;Disable Piccolo |
|---|---|

This instruction is encoded as:

| 31 30 29 28 | 27 26 25 24 | 23 22 21 20 | 19 18 17 16 | 15 14 13 12 | 11 10 9 8 | 7 6 5 4 | 3 | 2 1 0 |
|---|---|---|---|---|---|---|---|---|
| COND | 1110 | 0011 | 0000 | 0000 | PICCOLO1 | 000 | 0 | 0000 |

When this instruction is executed, the following occurs:
Piccolo's instruction pipeline will drain.
Piccolo will halt and the H bit in the Status register set.

This section discusses the Piccolo instruction set which controls the Piccolo data path. Each instruction is 32 bits long. The instructions are read from the Piccolo instruction cache.

Decoding the instruction set is quite straight forward. The top 6 bits (26 to 31) give a major opcode, with bits 22 to 25 providing a minor opcode for a few specific instructions. Bits shaded in grey are currently unused and reserved for expansion (they must contain the indicated value at present).

There are eleven major instruction classes. This does not fully correspond to the major opcode filed in the instruction, for ease of decoding some sub-classes.

```
3 3 2 2 2 2 2 2 2 2 2 2 1 1 1 1 1 1 1 1 1 1 9 8 7 6 5 4 3 2 1 0
1 0 9 8 7 6 5 4 3 2 1 0 9 8 7 6 5 4 3 2 1 0
```

| | | | | | | | | | | |
|---|---|---|---|---|---|---|---|---|---|---|
| 0 | OPC | | F | SD | DEST | S1 | R1 | SRC1 | SRC2 | |
| 1 | 000 | OPC | F | SD | DEST | S1 | R1 | SRC1 | SRC2 | |
| 1 | 001 | 0 | OP | F SD | DEST | S1 | R1 | SRC1 | SRC2 | |
| 1 | 0011 | | | | | | | | | |
| 1 | 010 | OPC | F | SD | DEST | S1 | R1 | SRC1 | SRC2_SHIFT | |
| 1 | 011 | 00 | F | SD | DEST | S1 | R1 | SRC1 | SRC2_SEL | COND |
| 1 | 011 | 01 | | | | | | | | |
| 1 | 011 | 1 | OP | F SD | DEST | S1 | R1 | SRC1 | SRC2_SEL | COND |
| 1 | 10 0 0 | OP | Sa | F SD | DEST | A1 | R1 | SRC1 | SRC2_MULA | |
| 1 | 10 1 | 0 | | | | | | | | |
| 1 | 10 1 0 | 1 OP | F | SD | DEST | A1 | R1 | SRC1 | 0 A0 R2 SRC2_REG | SCALE |
| 1 | 110 | | | | | | | | | |
| 1 | 11100 | | F SD | DEST | | IMMEDIATE_15 | | | | +/− |
| 1 | 11101 | | | | | | | | | |
| 1 | 11110 | 0 | RFIELD_4 | | 0 R1 | SRC1 | | #INSTRUCTIONS_8 | | |
| 1 | 11110 | 1 | RFIELD_4 | | #LOOPS_13 | | | #INSTRUCTIONS_8 | | |
| 1 | 11111 | 0 | OPC | | REGISTER_LIST_16 | | | SCALE | | |
| 1 | 11111 | 100 | | | IMMEDIATE_16 | | | COND | | |
| 1 | 11111 | 101 | | | PARAMETERS_21 | | | | | |
| 1 | 11111 | 11 | OP | | | | | | | |

The instructions in the above table have the following names:
Standard Data Operation
Logical Operation
Conditional Add/Subtract
Undefined
Shifts
Select
Undefined
Parallel Select
Multiply Accumulate
Undefined
Multiply Double
Undefined
Move Signed Immediate
Undefined
Repeat
Repeat
Register List Operations
Branch
Renaming Parameter Move
Halt/Break The format for each class of instructions is described in detail in the following sections. The source and destination operand fields are common to most instructions and described in detail in separate sections, as is the register re-mapping.

Most instructions require two source operands; Source 1 and Source 2. Some exceptions are saturating absolute.

The Source 1 (SRC1) operand has the following 7 bit format:

| 18 | 17 | 16 15 14 13 | 12 |
|---|---|---|---|
| Size | Refill | Register Number | Hi/Lo |

The elements of the field have the following meaning:
Size—indicates the size of operand to read (1=32-bit, 0=16-bit).
Refill—specifies that the register should be marked as empty after being read and can be refilled from the ROB.
Register Number—encodes which of the 16 registers to read.
Hi/Lo—For 16-bit reads indicates which half of the 32-bit register to read. For 32-bit operands, when set indicates that the two 16-bit halves of the register should be interchanged.

| Size | Hi/Lo | Portion of Register Accessed |
|---|---|---|
| 0 | 0 | Low 16 bits |
| 0 | 1 | High 16 bits |
| 1 | 0 | Full 32 bits |
| 1 | 1 | Full 32 bits, halves swapped |

The register size is specified in the assembler by adding a suffix to the register number: .l for the low 16 bits, .h for the high 16 bits or .x for 32 bits with the upper and lower sixteen bits interchanged.

The general Source 2 (SRC2) has one of the following three 12 bit formats:

| 11 | 10 | 9 | 8 | 7 6 5 | 4 | 3 2 1 0 |
|---|---|---|---|---|---|---|
| 0 | S2 | R2 | | 'Register Number | Hi/Lo | SCALE |
| 1 | 0 | ROT | | | IMMED_8 | |
| 1 | 1 | | | IMMED_6 | | SCALE |

Figure 4:
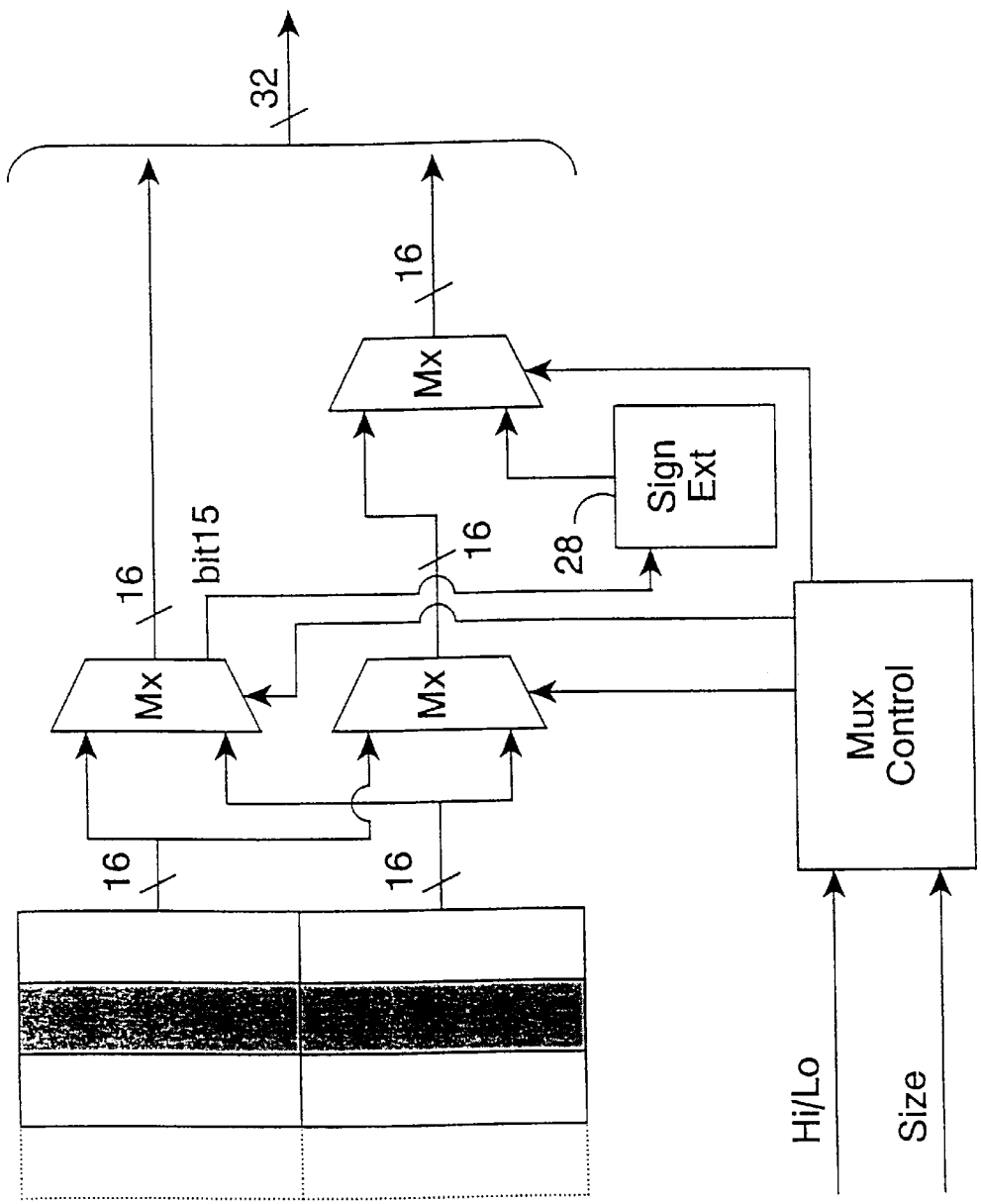
FIG. 4 illustrates a multiplexing circuit for read high or low order bits from a register.

FIG. 4 illustrates a multiplexer arrangement responsive to the Hi/Lo bit and Size bit to switch appropriate halves of the selected register to the Piccolo datapath. If the Size bit indicates 16 bits, then a sign extending circuit pads the high order bits of the datapath with 0s or 1s as appropriate.

The first encoding specifies the source as being a register, the fields having the same encoding as the SRC1 specifier. The SCALE field specifies a scale to be applied to the result of the ALU.

SCALE

| 3 | 2 | 1 | 0 | Action |
|---|---|---|---|--------|
| 0 | 0 | 0 | 0 | ASR #0 |
| 0 | 0 | 0 | 1 | ASR #1 |
| 0 | 0 | 1 | 0 | ASR #2 |
| 0 | 0 | 1 | 1 | ASR #3 |
| 0 | 1 | 0 | 0 | ASR #4 |
| 0 | 1 | 0 | 1 | RESERVED |
| 0 | 1 | 1 | 0 | ASR #6 |
| 0 | 1 | 1 | 1 | ASL #1 |
| 1 | 0 | 0 | 0 | ASR #8 |
| 1 | 0 | 0 | 1 | ASR #6 |
| 1 | 0 | 1 | 0 | ASR #10 |
| 1 | 0 | 1 | 1 | RESERVED |
| 1 | 1 | 0 | 0 | ASR #12 |
| 1 | 1 | 0 | 1 | ASR #13 |
| 1 | 1 | 1 | 0 | ASR #14 |
| 1 | 1 | 1 | 1 | ASR #15 |

The 8-bit immediate with rotate encoding allows the generation of a 32-bit immediate which is expressible by an 8-bit value and 2-bit rotate. The following table shows the immediate values that can be generated from the 8-bit value XY:

| ROT | IMMEDIATE |
|-----|-----------|
| 00  | 0x000000XY |
| 01  | 0x0000XY00 |
| 10  | 0x00XY0000 |
| 11  | 0xXY000000 |

The 6-bit Immediate encoding allows the use of a 6-bit unsigned immediate (range 0 to 63), together with a scale applied to the output of the ALU.

The general Source 2 encoding is common to most instruction variants. There are some exceptions to this rule which support a limited subset of the Source 2 encoding or modify it slightly:
Select Instructions.
Shift Instructions.
Parallel Operations.
Multiply Accumulate Instructions.
Multiply Double Instructions.

Select instructions only support an operand which is a register or a 6-bit unsigned immediate. The scale is not available as these bits are used by the condition field of the instruction.

SRC2_SEL

| 11 | 10 | 9 | 8 | 7 | 6 | 5 | 4 | 3 | 2 | 1 | 0 |
|----|----|---|---|---|---|---|---|---|---|---|---|
| 0 | S2 | R2 | Register number | | | Hi/Lo | COND | | | | |
| 1 | 1 | IMMED_6 | | | | | COND | | | | |

Shift instructions only support an operand which is a 16-bit register or a 5-bit unsigned immediate between 1 and 31. No scale of the result is available.

SRC2_SHIFT

| 11 | 10 | 9 | 8 | 7 | 6 | 5 | 4 | 3 | 2 | 1 | 0 |
|----|----|---|---|---|---|---|---|---|---|---|---|
| 0 | 0 | R2 | Register number | | | Hi/Lo | 0 | 0 | 0 | 0 | |
| 1 | 0 | 0 | 0 | 0 | 0 | 0 | IMMED_5 | | | | |

In the case of parallel operations, if a register is specified as the source of the operand, a 32-bit read must be performed. The immediate encoding has slightly different meaning for the parallel operations. This allows an immediate to be duplicated onto both 16-bit halves of a 32-bit operand. A slightly restricted range of scales are available for parallel operations.

SRC2_PARALLEL

| 11 | 10 | 9 | 8 | 7 | 6 | 5 | 4 | 3 | 2 | 1 | 0 |
|----|----|---|---|---|---|---|---|---|---|---|---|
| 0 | 1 | R2 | Register number | | | Hi/Lo | SCALE_PAR | | | | |
| 1 | 0 | ROT | | IMMED_8 | | | | | | | |
| 1 | 1 | IMMED_6 | | | | | SCALE_PAR | | | | |

If the 6-bit immediate is used then it is always duplicated onto both halves of the 32-bit quantity. If the 8-bit immediate is used it is duplicated only if the rotate indicates that the 8-bit immediate should be rotated onto the top half of the 32-bit quantity:

| ROT | IMMEDIATE |
|-----|-----------|
| 00  | 0x000000XY |
| 01  | 0x0000XY00 |
| 10  | 0x00XY00XY |
| 11  | 0xXY00XY00 |

No scale is available for parallel select operations; the scale field shall be set to 0 for these instructions.

The multiply accumulate instructions do not allow an 8-bit rotated immediate to be specified. Bit 10 of the field is used to partly specify which accumulator to use. Source 2 is implied as a 16-bit operand.

SRC2_MULA

| 11 | 10 | 9 | 8 | 7 | 6 | 5 | 4 | 3 | 2 | 1 | 0 |
|----|----|---|---|---|---|---|---|---|---|---|---|
| 0 | A0 | R2 | Register number | | | Hi/Lo | SCALE | | | | |
| 1 | A0 | IMMED_6 | | | | | SCALE | | | | |

Multiply double instructions do not allow the use of a constant. Only a 16-bit register can be specified. Bit 10 of the field is used to partly specify which accumulator to use.

SRC2_MULD

| 11 | 10 | 9 | 8 | 7 | 6 | 5 | 4 | 3 | 2 | 1 | 0 |
|----|----|---|---|---|---|---|---|---|---|---|---|
| 0 | A0 | R2 | Register number | | | Hi/Lo | SCALE | | | | |

Some instructions always imply a 32-bit operation (e.g. ADDADD), and in these cases the size bit shall be set to 1, with the Hi/Lo bit used to optionally swap the two 16-bit halves of the 32-bit operand. Some instructions always imply a 16-bit operation (e.g. MUL) and the size bit should be set to 0. The Hi/Lo bit then selects which half of the register is used (it is assumed that the missing size bit is clear). Multiply-accumlulate instructions allow independent specification of the source accumulator and destination registers. For these instructions the Size bits are used to indicate the source accumulator, and the size bits are implied by the instruction type as 0.

When a 16-bit value is read (via the A or B busses) it is automatically sign extended to a 32-bit quantity. If a 40 bit register is read (via the A or B busses), only the bottom 32 bits appear on the bus. Hence in all cases source 1 and source 2 are converted to 32-bit values. Only accumulate instructions using bus C can access the full 40 bits of an accumulator register.

If the refill bit is set, the register is marked as empty after use and will be refilled from the ROB by the usual refill mechanism (see the section on the ROB). Piccolo will not stall unless the register is used again as a source operand before the refill has taken place. The minimum number of cycles before the refilled data is valid (best case—the data is waiting at the head of the ROB) will be either 1 or 2. Hence it is advisable not to use the refilled data on the instruction following the refill request. If use of the operand on the next two instructions can be avoided it should be, since this will prevent performance loss on deeper pipeline implementations.

The refill bit is specified in the assembler by suffixing the register number with a '^'. The section of the register marked as empty depends on the register operand. The two halves of each register may be marked for refill independently (for example X0.1^ will mark only the bottom half of X0 for refill, X0^ will mark the whole of X0 for refill). When the top 'half' (bits 39:16) of a 40-bit register are refilled, the 16-bits of data is written to bits 31:16 and is sign extended up to bit 47.

If an attempt is made to refill the same register twice (eg ADD X1,X0^,X0^), then only one refill takes place. The assembler should only allow the syntax ADD X1,X0,X0^.

If a register read is attempted before that register has been refilled, Piccolo stalls waiting for the register to be refilled. If a register is marked for refill, and the register is then updated before the refilled value is read, the result will depend upon the particular hardware implementation and cannot be relied upon by a programmer (for example ADD X0, X0^, X1 is unpredictable since it marks X0 for refill and then refills it by placing the sum of X0 and X1 into it).

The 4-bit scale field encodes fourteen scale types:

ASR #0, 1, 2, 3, 4, 6, 8, 10

ASR #12 to 16

LSL #1

Parallel Max/Min instructions do not provide a scale, and therefore the six bit constant variant of source 2 is unused (Set to 0 by assembler).

Within a REPEAT instruction register re-mapping is supported, allowing a REPEAT to access a moving 'window' of registers without unrolling the loop. This is described in more detail in below.

Destination operands have the following 7 bit format:

| 25 | 24 | 23 | 22 | 21 | 20 | 19 |
|----|----|----|----|----|----|----|
| F | SD | HL | DEST | | | |

There are ten variants of this basic encoding:

| Assembler Mnemonic | | 25 | 24 | 23 | 22 | 21 | 20 | 19 |
|---|---|---|---|---|---|---|---|---|
| Dx | 1 | 0 | 1 | 0 | Dx | | | |
| Dx^ | 2 | 1 | 1 | 0 | Dx | | | |
| Dx.1 | 3 | 0 | 0 | 0 | Dx | | | |
| Dx.1^ | 4 | 1 | 0 | 0 | Dx | | | |
| Dx.h | 5 | 0 | 0 | 1 | Dx | | | |
| Dx.h^ | 6 | 1 | 0 | 1 | Dx | | | |
| Undefined | | 0 | 1 | 1 | 0000 | | | |
| .1 (No register writeback 16-bits) | 7 | 1 | 1 | 1 | 0 | 0 | 00 | |
| ″ (No register writeback 32-bits) | 8 | 1 | 1 | 1 | 0 | 1 | 00 | |
| .1^ (16-bit) output | 9 | 1 | 1 | 1 | 1 | 0 | 00 | |
| ^ (32-bit) output | 10 | 1 | 1 | 1 | 1 | 1 | 00 | |

The register number (Dx) indicates which of the 16 registers is being addressed. The Hi/Lo bit and the Size bit work together to address each 32-bit register as a pair of 16-bit registers. The Size bit defines how the appropriate flags, as defined in the instruction type, will be set, irrespective of whether a result is written to the register bank and/or output FIFO. This allows the construction of compares and similar instructions. The add with accumulate class of instruction must write back the result to a register.

The following table shows the behaviour of each encoding:

| Encoding | Register Write | FIFO Write | V FLAG |
|---|---|---|---|
| 1 | Write whole register | No write | 32-bit overflow |
| 2 | Write whole register | Write 32 bits | 32-bit overflow |
| 3 | Write low 16-bits to Dx.1 | No write | 16-bit overflow |
| 4 | Write low 16-bits to Dx.1 | Write low 16-bits | 16-bit overflow |
| 5 | Write low 16-bits to Dx.h | No write | 16-bit overflow |
| 6 | Write low 16-bits to Dx.h | Write low 16-bits | 16-bit overflow |
| 7 | No write | No write | 16-bit overflow |
| 8 | No write | No write | 32-bit overflow |
| 9 | No write | Write low 16-bits | 16-bit overflow |
| 10 | No write | Write 32-bits | 32-bit overflow |

In all cases the result of any operation prior to writing back to a register or inserting into the output FIFO is a 40 bit quantity. There are two cases:

If the write is of 16-bits the 40 bit quantity is reduced to a 16-bit quantity by selecting the bottom 16 bits [15:0]. If the instruction saturates then the value will be saturated into the range −2^15 to 2^15−1. The 16-bit value is then written back to the indicated register and, if the Write FIFO bit is set, to the output FIFO. If it is written to the output FIFO then it is held until the next 16-bit value is written when the values are paired up and placed into the output FIFO as a single 32-bit value.

For 32-bit writes the 40 bit quantity is reduced to a 32-bit quantity by selecting the bottom 32 bits [31:0].

For both 32-bit and 40-bit writes, if the instruction saturates the 40-bit value will be converted to a 32-bit value in the range −2^31−1 to 2^31. Following the saturation:

If writeback to an accumulator is performed, the full 40 bits will be written.

If writeback to a 32-bit register is performed, bits [31:0] are written.

If writeback to the output FIFO is indicated, again bits [31:0] will be written.

The destination size is specified in the assembler by a .1 or .h after the register number. If no register writeback is performed then the register number is unimportant, so omit the destination register to indicate no write to a register or use ^ to indicate a write only to the output FIFO. For example, SUB , X0, Y0 is equivalent to CMP X0, Y0 and ADD ^, X0, Y0 places the value of X0+Y0 into the output FIFO.

If there is no room in the output FIFO for a value, Piccolo stalls waiting for space to become available.

If a 16-bit value is written out, for example ADD X0.h^, X1, X2, then the value is latched until a second 16-bit value is written. The two values are then combined and placed into the output FIFO as a 32-bit number. The first 16-bit value written always appears in the lower half of the 32-bit word. An an alternative to the STP16 and STP32 mechanisms described earlier, data entered into the output FIFO may be marked as either 16 or 32-bit data, to allow endianess to be corrected on big endian systems.

If a 32-bit value is written between two 16-bit writes then the outcome will depend upon the particular hardware implementation and cannot be relied upon by a programmer.

Within a REPEAT instruction register re-mapping is supported, allowing a REPEAT to access a moving 'window' of registers without unrolling the loop. This is described in more detail below.

In preferred embodiments of the present invention, the REPEAT instruction provides a mechanism to modify the way in which register operands are specified within a loop. Under this mechanism, the registers to be accessed are determined by a function of the register operand in the instruction and an offset into the register bank. The offset is changed in a programmable manner, preferably at the end of each instruction loop. The mechanism may operate independently on registers residing in the X, Y and Z banks. In preferred embodiments, this facility is not available for registers in the A bank.

The notion of a logical and physical register can be used. The instruction operands are logical register references, and these are then mapped to physical register references identifying specific Piccolo registers 10. All operations, including refilling, operate on the physical register. The register remapping only occurs on the Piccolo instruction stream side—data loaded into Piccolo is always destined for a physical register, and no remapping is performed.

The remapping mechanism will be discussed further with reference to FIG. 5, which is a block diagram illustrating a number of the internal components of the Piccolo coprocessor 4. Data items retrieved by the ARM core 2 from memory are placed in the reorder buffer 12, and the Piccolo registers 10 are refilled from the reorder buffer 12 in the manner described earlier with reference to FIG. 2. Piccolo instructions stored in the cache 6 are passed to an instruction decoder 50 within Piccolo 4, where they are decoded prior to being passed to the Piccolo processor core 54. The Piccolo processor core 54 includes the multiplier/adder circuit 20, the accumulate/decumulate circuit 22, and the scale/saturate circuit 24 discussed earlier with reference to FIG. 3.

If the instruction decoder 50 is handling instructions forming part of an instruction loop identified by a REPEAT instruction, and the REPEAT instruction has indicated that remapping of a number of registers should take place, then the register remapping logic 52 is employed to perform the necessary remapping. The register remapping logic 52 can be considered as being part of the instruction decoder 50, although it will be apparent to those skilled in the art that the register remapping logic 52 may be provided as a completely separate entity to the instruction decoder 50.

An instruction will typically include one or more operands identifying registers containing the data items required by the instruction. For example, a typical instruction may include two source operands and one destination operand, identifying two registers containing data items required by the instruction, and a register in to which the result of the instruction should be placed. The register remapping logic 52 receives the operands of an instruction from the instruction decoder 50, these operands identifying logical register references. Based on the logical register references, the register remapping logic will determine whether remapping should or should not be applied, and will then apply a remapping to physical register references as required. If it is determined that remapping should not be applied, the logical register references are provided as the physical register references. The preferred manner in which the remapping is performed will be discussed in more detail later.

Each output physical register reference from the register remapping logic is passed to the Piccolo processor core 54, such that the processor core can then apply the instruction to the data item in the particular register 10 identified by the physical register reference.

The remapping mechanism of the preferred embodiment allows each bank of registers to be split into two sections, namely a section within which registers may be remapped, and a section in which registers retain their original register references without remapping. In preferred embodiments, the remapped section starts at the bottom of the register bank being remapped.

Figure 6:
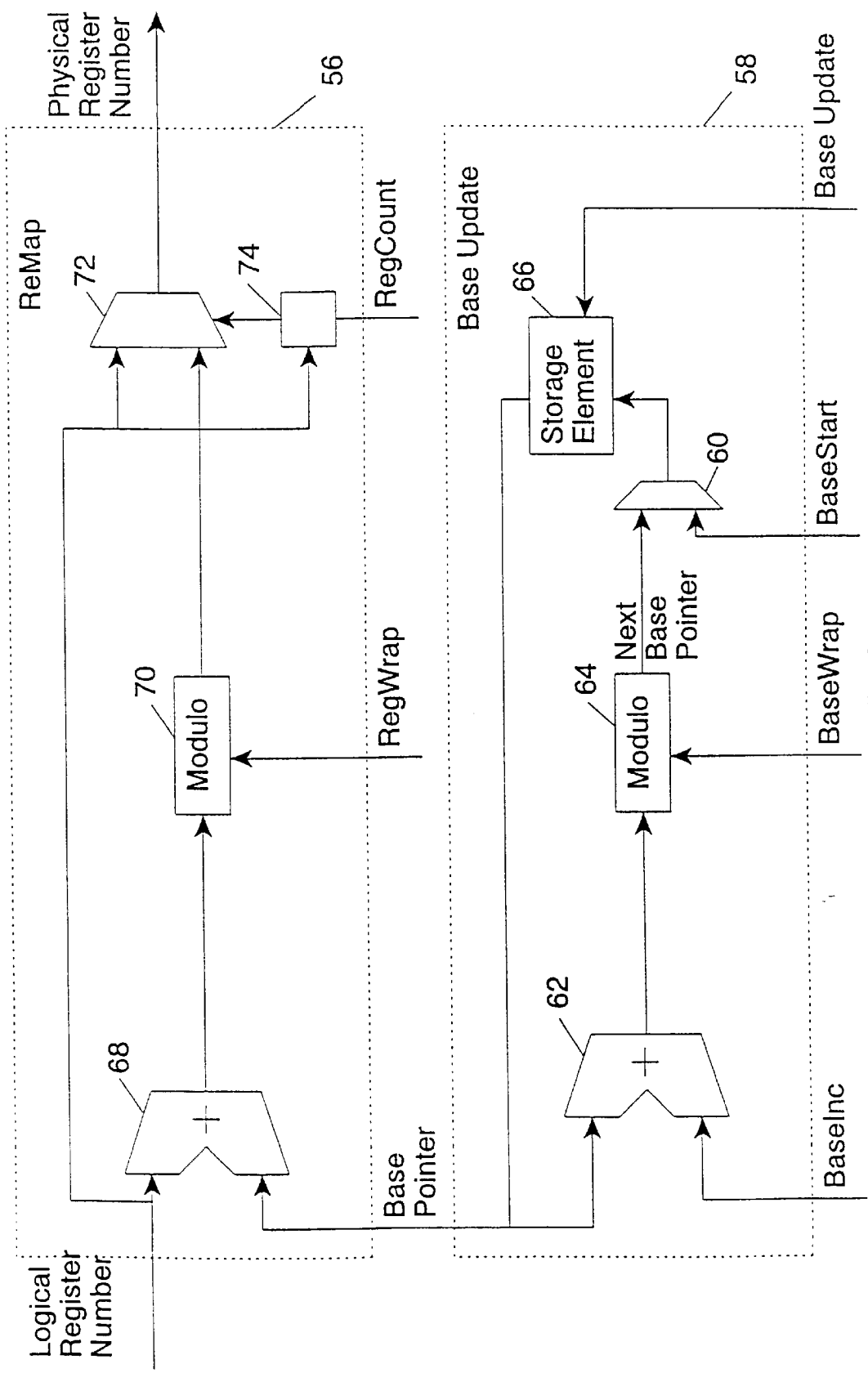
FIG. 6 illustrates in more detail the register remapping logic shown in FIG. 5.

A number of parameters are employed by the remapping mechanism, and these parameters will be discussed in detail with reference to FIG. 6, which is a block diagram illustrating how the various parameters are used by the register remapping logic 52. It should be noted that these parameters are given values that are relative to a point within the bank being remapped, this point being, for example, the bottom of the bank.

The register remapping logic 52 can be considered as comprising two main logical blocks, namely the Remap block 56 and the Base Update block 58. The register remapping logic 52 employs a base pointer that provides an offset value to be added to the logical register reference, this base pointer value being provided to the remap block 56 by base update block 58.

A BASESTART signal can be used to define the initial value of the base pointer, this for example typically being zero, although some other value may be specified. This BASESTART signal is passed to multiplexer 60 within the Base Update block 58. During the first iteration of the instruction loop, the BASESTART signal is passed by the multiplexer 60 to the storage element 66, whereas for subsequent iterations of the loop, the next base pointer value is supplied by the multiplexer 60 to the storage element 66.

The output of the storage element 66 is passed as the current base pointer value to the ReMap logic 56, and is also passed to one of the inputs of an adder 62 within the Base Update logic 58. The adder 62 also receives a BASEINC signal that provides a base increment value. The adder 62 is arranged to increment the current base pointer value supplied by storage element 66 by the BASEINC value, and to pass the result to the modulo circuit 64.

The modulo circuit also receives a BASEWRAP value, and compares this value to the output base pointer signal from the adder 62. If the incremented base pointer value equals or exceeds the BASEWRAP value, the new base pointer is wrapped round to a new offset value. The output of the modulo circuit 64 is then the next base pointer value to be stored in storage element 66. This output is provided to the multiplexer 60, and from there to the storage element 66.

However, this next base pointer value cannot be stored in the storage element 66 until a BASEUPDATE signal is received by the storage element 66 from the loop hardware managing the REPEAT instruction. The BASEUPDATE signal will be produced periodically by the loop hardware, for example each time the instruction loop is to be repeated. When a BASEUPDATE signal is received by the storage element 66, the storage element will overwrite the previous base pointer value with the next base pointer value provided by the multiplexer 60. In this manner, the base pointer value supplied to the ReMap logic 58 will change to the new base pointer value.

The physical register to be accessed inside a remapped section of a register bank is determined by the addition of a logical register reference contained within an operand of an instruction, and the base pointer value provided by the base update logic 58. This addition is performed by adder 68 and the output is passed to modulo circuit 70. In preferred embodiments, the modulo circuit 70 also receives a register wrap value, and if the output signal from the adder 68 (the addition of the logical register reference and the base pointer value) exceeds the register wrap value, the result will wrap through to the bottom of the remapped region. The output of the modulo circuit 70 is then provided to multiplexer 72.

A REGCOUNT value is provided to logic 74 within Remap block 56, identifying the number of registers within a bank which are to be remapped. The logic 74 compares this REGCOUNT value with the logical register reference, and passes a control signal to multiplexer 72 dependent on the result of that comparison. The multiplexer 72 receives as its two inputs the logical register reference and the output from modulo circuit 70 (the remapped register reference). In preferred embodiments of the present invention, if the logical register reference is less than the REGCOUNT value, then the logic 74 instructs the multiplexer 72 to output the remapped register reference as the Physical Register Reference. If, however, the logical register reference is greater than or equal to the REGCOUNT value, then the logic 74 instructs the multiplexer 72 to output the logical register reference directly as the physical register reference.

As previously mentioned, in preferred embodiments, it is the REPEAT instruction which invokes the remapping mechanism. As will be discussed in more detail later, REPEAT instructions provide four zero cycle loops in hardware. These hardware loops are illustrated in FIG. 5 as part of the instruction decoder 50. Each time the instruction decoder 50 requests an instruction from cache 6, the cache returns that instruction to the instruction decoder, whereupon the instruction decoder determines whether the returned instruction is a REPEAT instruction. If so, one of the hardware loops is configured to handle that REPEAT instruction.

Each repeat instruction specifies the number of instructions in the loop and the number of times to go around the loop (which is either a constant or read from a Piccolo register). The opcode REPEAT and an associated assembler mnemonic NEXT are provided for defining a hardware loop, the NEXT mnemonic being used merely as a delimiter and not being assembled as an instruction. The REPEAT goes at the start of the loop, and NEXT delimits the end of the loop, allowing the assembler to calculate the number of instructions in the loop body. In preferred embodiments, the REPEAT instruction can include remapping parameters such as the REGCOUNT, BASEINC, BASEWRAP and REGWRAP parameters to be employed by the register remapping logic 52.

A number of registers can be provided to store remapping parameters used by the register remapping logic. Within these registers, a number of sets of predefined remapping parameters can be provided, whilst some registers are left for the storage of user defined remapping parameters. If the remapping parameters specified with the REPEAT instruction are equal to one of the sets of predefined remapping parameters, then the appropriate REPEAT encoding is used, this encoding causing a multiplexer or the like to provide the appropriate remapping parameters from the registers directly to the register remapping logic. If, on the other hand, the remapping parameters are not the same as any of the sets of predefined remapping parameters, then the assembler will generate a Remapping Parameter Move Instruction (RMOV) which allows the configuration of the user defined register remapping parameters, the RMOV instruction being followed by the REPEAT instruction. Preferably, the user defined remapping parameters would be placed by the RMOV instruction in the registers left aside for storing such user defined remapping parameters, and the multiplexer would then be programmed to pass the contents of those registers to the register remapping logic.

In the preferred embodiments, the REGCOUNT, BASEINC, BASEWRAP and REGWRAP parameters take one of the values identified in the following chart:

| PARAMETER | DESCRIPTION |
| --- | --- |
| REGCOUNT | This identifies the number of 16 bit registers to perform remapping on, and may take the values 0, 2, 4, 8. Registers below REGCOUNT are remapped, those above or equal to REGCOUNT are accessed directly. |
| BASEINC | This defines by how many 16 bit registers the base pointer is incremented at the end of each loop iteration. It may in preferred embodiments take the values 1, 2, or 4, although in fact it can take other values if desired, including negative values where appropriate. |
| BASEWRAP | This determines the ceiling of the base calculation. The base wrapping modulus may take the values 2, 4, 8. |
| REGWRAP | This determines the ceiling of the remap calculation. The register wrapping modulus may take the values 2, 4, 8. REGWRAP may be chosen to be equal to REGCOUNT. |

Returning to FIG. 6, an example of how the various parameters are used by the remap block 56 is as follows (in this example, the logical and physical register values are relative to the particular bank):

```
if (Logical Register < REGCOUNT)
  Physical Register = (Logical Register + Base) MOD RBGCOUNT
else
  Physical Register = Logical Register
end if
```

At the end of the loop, before the next iteration of the loop begins, the following update to the base pointer is performed by the base update logic 58:

Base=(Base+BASEINC) MOD BASEWRAP

At the end of a remapping loop, the register remapping will be switched off and all registers will then be accessed as physical registers. In preferred embodiments, only one remapping REPEAT will be active at any one time. Loops may still be nested, but only one may update the remapping variables at any particular time. However, it will be appreciated that, if desired, remapping repeats could be nested.

To illustrate the benefits achieved with regards to code density as a result of employing the remapping mechanism according to the preferred embodiment of the present invention, a typical block filter algorithm will now be discussed. The principles of the block filter algorithm will first be discussed with reference to FIG. 7. As illustrated in FIG. 7, accumulator register A0 is arranged to accumulate the results of a number of multiplication operations, the multiplication operations being the multiplication of coefficient c0 by data item d0, the multiplication of coefficient c1 by data item d1, the multiplication of coefficient c2 by data item d2, etc. Register A1 accumulates the results of a similar set of multiplication operations, but this time the set of coefficients have been shifted such that c0 is now multiplied by d1, c1 is now multiplied by d2, c2 is now multiplied by d3, etc. Likewise, register A2 accumulates the results of multiplying the data values by the coefficient values shifted another step to the right, such that c0 is multiplied by d2, c1 is multiplied by d3, c2 is multiplied by d4, etc. This shift, multiply, and accumulate process is then repeated with the result being placed in register A3.

If register remapping in accordance with the preferred embodiment of the present invention is not employed, then the following instruction loop will be required to perform the block filter instruction:

```
; start with 4 new data values
ZERO {A0–A3}                    ; Zero the accumulators
REPEAT Z1                       ; Z1= (number of coeffs/4)
; do the next four coefficients, on the first time around:
; a0 += d0*c0+d1*c1+d2*c2+d3*c3
; a1 += d1*c0+d2*c1+d3*c2+d4*c3
; a2 += d2*c0+d3*c1+d4*c2+d5*c3
; a3 += d3*c0+d4*c1+d5*c2+d6*c3
MULA    A0, X0.l^, Y0.l, A0     ; a0 += d0*c0, and load d4
MULA    A1, X0.h, Y0.l, A1      ; a1 += d1*c0
MULA    A2, X1.l, Y0.l, A2      ; a2 += d2*c0
MULA    A3, X1.h, Y0.l^, A3     ; a3 += d3*c0, and load c4
MULA    A0, X0.h^, Y0.h, A0     ; a0 += d1*c1, and load d5
MULA    A1, X1.l, Y0.h, A1      ; a1 += d2*c1
MULA    A2, X1.h, Y0.h, A2      ; a2 += d3*c1
MULA    A3, X0.l, Y0.h^, A3     ; a3 += d4*c1, and load c5
MULA    A0, X1.l^, Y1.l, A0     ; a0 += d2*c2, and load d6
MULA    A1, X1.h, Y1.l, A1      ; a1 += d3*c2
MULA    A2, X0.l, Y1.l, A2      ; a2 += d4*c2
MULA    A3, X0.h, Y1.l^, A3     ; a3 += d5*c2, and load c6
MULA    A0, X1.h^, Y1.h, A0     ; a0 += d3*c3, and load d7
MULA    A1, X0.l, Y1.h, A1      ; a1 += d4*c3
MULA    A2, X0.h, Y1.h, A2      ; a2 += d5*c3
MULA    A3, X1.l, Y1.h^, A3     ; a3 += d6*c3, and load c7
NEXT
```

In this example, the data values are placed in the X bank of registers and the coefficient values are placed in the Y bank of registers. As a first step, the four accumulator registers A0, A1, A2, and A3 are set to zero. Once the accumulator registers have been reset, an instruction loop is then entered, which is delimited by the REPEAT and NEXT instructions. The value Z1 identifies the number of times that the instruction loop should be repeated, and for the reasons that will be discussed later, this will actually be equal to the number of coefficients (C0, c1, c2, etc.) divided by 4.

The instruction loop comprises 16 multiply accumulate instructions (MULA), which, after the first iteration through the loop, will result in the registers A0, A1, A2, A3 including the result of the calculations shown in the above code between the REPEAT and the first MULA instruction. To illustrate how the multiply accumulate instructions operate, we will consider the first four MULA instructions. The first instruction multiplies the data value within the first, or lower, 16 bits of the X bank register zero with the lower 16 bits within Y bank register zero, and adds the result to the accumulator register AO. At the same time the lower 16 bits of the X bank register zero are marked by a refill bit, this indicating that that part of the register can now be refilled with a new data value. It is marked in this way, since as will be apparent from FIG. 7, once data item d0 has been multiplied by the coefficient c0 (this being represented by the first MULA instruction), then d0 is no longer required for the rest of the block filter instruction and so can be replaced by a new data value.

The second MULA instruction then multiplies the second, or higher 16 bits of the X bank register zero with the lower 16 bits of the Y bank register zero (this representing the multiplication d1×c0 shown in FIG. 7). Similarly, the third and fourth MULA instructions represent the multiplications d2×c0, and d3×c0, respectively. As will be apparent from FIG. 7, once these four calculations have been performed, coefficient C0 is no longer required and so the register Y0.1 is marked by a refill bit to enable it to be overwritten with another coefficient (c4).

The next four MULA instructions represent the calculations d1×c1, d2×c1, d3×c1, and d4×c1, respectively. Once the calculation d1×c1 has been performed, the register X0.h is marked by a refill bit since d1 is no longer required. Similarly, once all four calculations have been performed, the register Y0.h is marked for refilling, since the coefficient c1 is no longer needed. Similarly, the next four WULA instructions correspond to the calculations d2×c2, d3×c2, d4×c2, and d5×c2, whilst the final four calculations correspond to the calculations d3×c3, d4×c3, d5×c3, and d6×c3.

Since, in the above described embodiment, registers are not remappable, each multiplication operation has to be reproduced explicitly with the specific register required being designated in the operands. Once the sixteen MULA instructions have been performed, the instruction loop can be repeated for coefficients c4 to c7 and data items d4 to d10. Also, because the loop acts on four coefficient values per iteration, then the number of coefficient values must be a multiple of four and the computation Z1=no. of coeffs/4 must be calculated.

By employing the remapping mechanism in accordance with the preferred embodiment of the present invention, the instruction loop can be dramatically reduced, such that it now only includes 4 multiply accumulate instructions, rather than the 16 multiply accumulate instructions that were otherwise required. Using the remapping mechanism, the code can now be written as follows:

```
; start with 4 new data values
ZERO {A0–A3}                    ; Zero the accumulators
REPEAT Z1, X++ n4 w4 r4, Y++ n4 w4 r4; Z1= (number of coefficients)
; Remapping is applied to the X and Y banks.
; Four 16 bit registers in these banks are remapped.
; The base pointer for both banks is incremented by one on each
; iteration of the loop.
; The base pointer wraps when it reaches the fourth register in the
; bank.
MULA    A0, X0.l^, Y0.l, A0     ; a0 += d0*c0, and load d4
MULA    A1, X0.h, Y0.l, A1      ; a1 += d1*c0
MULA    A2, X1.l, Y0.l, A2      ; a2 += d2*c0
MULA    A3, X1.h, Y0.l^, A3     ; a3 += d3*c0, and load c4
NEXT                            ; go round loop and advance remapping
```

As before, the first step is to set the four accumulator registers A0–A3 to zero. Then, the instruction loop is entered, delimited by the REPEAT and NEXT opcodes. The REPEAT instruction has a number of parameters associated therewith, which are as follows:

X++: indicates that BASEINC is '1' for the X Bank of registers n4: indicates that REGCOUNT is '4' and hence the first four X Bank registers X0.1 to X1.h are to be remapped w4: indicates that BASEWRAP is '4' for the X Bank of registers r4: indicates that REGWRAP is '4' for the X Bank of registers Y++: indicates that BASEINC is '1' for the Y Bank of registers n4: indicates that REGCOUNT is '4' and hence the first four Y Bank registers Y0.1 to Y1.h are to be remapped w4: indicates that BASEWRAP is '4' for the Y Bank of registers r4: indicates that RBGWRAP is '4' for the Y Bank of registers It should also be noted that now the value Z1 is equal to the number of coefficients, rather than being equal to the number of coefficients/4 as in the prior art example.

For the first iteration of the instruction loop, the base pointer value is zero, and so there is no remapping. However, next time the loop is executed, the base pointer value will be '1' for both the X and Y banks, and so the operands will be mapped as follows:

X0.1 becomes X0.h
X0.h becomes X1.1
X1.1 becomes X1.h
X1.h becomes X0.1 (since BASEWRAP is '4')
Y0.1 becomes Y0.h
Y0.h becomes Y1.1
Y1.1 becomes Y1.h
Y1.h becomes Y0.1 (since BASEWRAP is '4')

Hence, it can be seen that on the second iteration, the four MULA instructions actually perform the calculations indicated by the fifth to eight MULA instructions in the example discussed earlier that does not include the remapping of the present invention. Similarly, the third and fourth iterations through the loop perform the calculations formerly performed by the ninth to twelfth, and thirteenth to sixteenth MULA instructions of the prior art code.

Hence, it can be seen that the above code performs exactly the same block filter algorithm as the prior art code, but improves code density within the loop body by a factor of four, since only four instructions need to be provided rather than the sixteen required by the prior art.

By employing the register remapping technique in accordance with preferred embodiments of the present invention, the following benefits can be realised:

1. It improves code density;
2. It can in certain situations hide the latency from marking a register being as empty to that register being refilled by Piccolo's reorder buffer. This could be achieved by unrolling loops, at the cost of increased code size;
3. It enables a variable number of registers to be accessed—by varying the number of loop iterations performed the number of registers accessed may be varied; and
4. It can ease algorithm development. For suitable algorithms, the programmer can produce a piece of code for the nth stage of the algorithm, then use register remapping to apply the formula to a sliding set of data.

It will be apparent that certain changes can be made to the above described register remapping mechanism without departing from the scope of the present invention. For example, it is possible for the bank of registers 10 to provide more physical registers than can be specified by the programmer in an instruction operand. Whilst these extra registers cannot be accessed directly, the register remapping mechanism can make these registers available. For example, consider the example discussed earlier where the X bank of registers has four 32 bit registers available to the programmer, and hence eight 16 bit registers can be specified by logical register references. It is possible for the X bank of registers to actually consist of, for example, six 32 bit registers, in which case there will be four additional 16 bit registers not directly accessible to the programmer. However, these extra four registers can be made available by the remapping mechanism thereby providing additional registers for the storage of data items.

The following assembler syntax may will be used:

>> means logical shift right or shift left if the shift operand is negative (see <lscale> below).

–>> means arithmetic shift right or shift left if the shift operand is negative (see <scale> below).

SAT(a) means the saturated value of a (saturated to 16 or 32 bits depending on the size of the destination register). Specifically, to saturate to 16 bits, any value greater than +0x7fff is replaced by +0x7fff and any value less than –0x8000 is replaced by –0x8000. Saturation to 32 bits is similar with extremes +0x7fffffff and –0x80000000. If the destination register is 40 bits the saturation is still at 32 bits.

Source operand 1 can be one of the following formats:

<src1> will be used a shorthand for [Rn¦Rn.1¦Rn.h¦Rn.x] [^]. In other words all 7 bits of the source specifier are valid and the register is read as a 32-bit value (optionally swapped) or a 16-bit value sign extended. For an accumulator only the bottom 32 bits are read. The ^ specifies register refill.

<src1_16> is short for [Rn.1¦Rn.h][^]. Only 16-bit values can be read.

<src1_32> is short for [Rn¦Rn.x][^]. Only a 32-bit value can be read, with the upper and lower halves optionally swapped.

Source operand 2 can be one of the following formats:

<src2> will be a shorthand for three options:
  a source register of the form [Rn¦Rn.1¦Rn.h¦Rn.x][^], plus a scale (<scale>) of the final result.
  an optionally shifted eight bit constant (<immed_8>), but no scale of the final result.
  a six bit constant (<immed_6>), plus a scale (<scale>) of the final result.

<src2_maxmin> is the same as <src2> but a scale is not permitted.

<src2_shift> shift instructions provide a limited subset of <src2>. See above. for details.

<src2_par> as for <src2_shift>

For instructions which specify a third operand:

<acc> is short for any of the four accumulator registers [A0¦A1¦A2¦A3].

All 40 bits are read. No refill can be specified.

The destination register has the format:

<dest> which is short for [Rn¦Rn.1¦Rn.h¦.1¦][^]. With no "." extension the full register is written (40 bits in the case of an accumulator).

In the case where no write back to the register is required, the register used is unimportant. The assembler supports the omission of a destination register to indicate that write back is not required or ".1" to indicate that no writeback is required but flags should be set as though the result is a 16-bit quantity. ^ denotes that the value is written to the output FIFO.

<scale> represents a number of arithmetic scales. There are fourteen available scales:
  ASR #0, 1, 2, 3, 4, 6, 8, 10
  ASR #12 to 16
  LSL #1

<immed_8> stands for a unsigned 8-bit immediate value. This consists of a byte rotated left by a shift of 0, 8, 16 or 24. Hence values 0xYZ000000, 0x00YZ0000, 0x0000YZ00 and 0x000000YZ can be encoded for any YZ. The rotate is encoded as a 2 bit quantity.

<imm_6> Stands for an unsigned 6-bit immediate.
<PARAMS> is used to specify register re-mapping and has the following format:
   <BANK><BASEINC> n<RENUMBER> w<BASEWRAP>
<BANK> can be [X¦Y¦Z]
<BASEINC> can be [++¦+1¦+2¦+4]
<RENUMBER> can be [0¦2¦4¦8]
<BASEWRAP> can be [2¦4¦8]

The expression <cond> is shorthand for any one of the following condition codes. Note that the encoding is slightly different from the ARM since the unsigned LS and HI codes have been replaced by more useful signed overflow/underflow tests. The V and N flags are set differently on Piccolo than on the ARM so the translation from condition testing to flag checking is not the same as the ARM either.

| | | | |
|---|---|---|---|
| 0000 | EQ | Z=0 | Last result was zero. |
| 0001 | NE | Z=1 | Last result was non zero. |
| 0010 | CS | C=1 | Used after a shift/MAX operation. |
| 0011 | CC | C=0 | |
| 0100 | MI/LT | N=1 | Last result was negative. |
| 0101 | PL/GE | N=0 | Last result was positive |
| 0110 | VS | V=1 | Signed overflow/saturation on last result |
| 0111 | VC | V=0 | No overflow/saturation on last result |
| 1000 | VP | V=1 & N=0 | Overflow positive on last result. |
| 1001 | VN | V=1 & N=1 | Overflow negative on last result |
| 1010 | reserved | | |
| 1011 | reserved | | |
| 1100 | GT | N=0 & Z=0 | |
| 1101 | LE | N=1 ¦ Z=1 | |
| 1110 | AL | | |
| 1111 | reserved | | |

Since Piccolo deals with signed quantities, the unsigned LS and HI conditions have been dropped and replaced by VP and VN which describe the direction of any overflow. Since the result of the ALU is 40 bits wide, MI and LT now perform the same function, similarly PL and GE. This leaves 3 slots for future expansion.

All operations are signed unless otherwise indicated.

The primary and secondary condition codes each consist of:
N—negative.
Z—zero.
C—carry/unsigned overflow.
V—signed overflow.

Arithmetic instructions can be divided into two types; parallel and 'full width'. The 'full width' instructions only set the primary flags, whereas the parallel operators set the primary and secondary flags based on the upper and lower 16-bit halves of the result.

The N, Z and V flags are calculated based on the full ALU result, after the scale has been applied but prior to being written to the destination. An ASR will always reduce the number of bits required to store the result, but an ASL would increase it. To avoid this Piccolo truncates the 40-bit result when an ASL scale is applied, to limit the number of bits over which zero detect and overflow must carried out.

The N flag is calculated presuming signed arithmetic is being carried out. This is because when overflow occurs, the most significant bit of the result is either the C flag or the N flag, depending on whether the input operands are signed or unsigned.

The V flag indicates if any loss of precision occurs as a result of writing the result to the selected destination. If no write-back is selected a 'size' is still implied, and the overflow flag is set correctly. Overflow can occur when:

Writing to a 16-bit register when the result is not in the range $-2^{15}$ to $2^{15}-1$.

Writing to a 32-bit register when the result is not in the range $-2^{31}$ to $2^{31}-1$.

Parallel add/subtract instructions set the N, Z and V flags independently on the upper and lower halves of the result.

When writing to an accumulator the V flag is set as if writing to a 32-bit register. This is to allow saturating instructions to use accumulators as 32-bit registers.

The saturating absolute instruction (SABS) also sets the overflow flag if the absolute value of the input operand would not fit in designated destination.

The Carry flag is set by add and subtract instructions and is used as a 'binary' flag by the MAX/MIN, SABS and CLB instructions. All other instructions, including multiply operations preserve the Carry flag(s).

For add and subtract operations the Carry is that which is generated by either bit 31 or bit 15 or the result, based on whether the destination is 32 or 16-bits wide.

The standard arithmetic instructions can be divided up into a number types, depending on how the flags are set:

In the case of Add and Subtract instructions, if the N bit is set, then all flags are preserved. If the N bit is not set then the flags are updated as follows:

Z is set if the full 40 bit result was 0.

N is set if the full 40 bit result had bit 47 set (was negative).

V is set if either:
  The destination register is 16-bit and the signed result will not fit into a 16-bit register (not in the range $-2^{15}<=x<2^{15}$)
  The destination register is a 32/40 bit register and the signed result will not fit into 32 bits.

If <dest> is a 32 or 40 bit register then the C flag is set if there is a carry out of bit 31 when summing <src1> and <src2> or if no borrow occurred from bit 31 when subtracting <src2> from <src1> (the same carry value you would expect on the ARM). If <dest> is a 16-bit register then the C flag is set if there is a carry out of bit 15 of the sum.

The secondary flags (SZ, SN, SV, SC) are preserved.

In the case of instructions which either carry out a multiplication or accumulate from a 40-bit register.

Z is set if the full 40 bit result was 0.

N is set if the full 40 bit result had bit 47 set (was negative).

V is set if either (1) the destination register is 16-bit and the signed result will not fit into a 16-bit register (not in the range $-2^{15}<=x<2^{15}$) or (2) the destination register is a 32/40 bit register and the signed result will not fit into 32 bits.

C is preserved.

The secondary flags (SZ, SN, SV, SC) are preserved.

The other instructions, including logical operations, parallel adds and subtracts, max and min, shifts etc. are covered below.

The Add and Subtract instructions add or subtract two registers, scale the result, and then store back to a register. The operands are treated as signed values. Flag updating for the non-saturating variants is optional and may be suppressed by appending an N to the end of the instruction.

| 31 30 29 28 27 26 25 | 24 | 23 22 21 20 19 18 17 | 16 15 14 | 13 12 11 10 9 8 | 7 6 5 4 3 2 1 0 |
|---|---|---|---|---|---|
| 0 OPC | F | S D | DEST | S1 R 1 | SRC1 | SRC2 |

OPC specifies the type of instruction.

Action (OPC):

| | |
|---|---|
| 100N0 | dest = (src1 + src2) (->> scale) (, N) |
| 110N0 | dest = (src1 – src2) (->> scale) (, N) |
| 10001 | dest = SAT((src1 + src2) (->> scale)) |
| 11001 | dest = SAT((src1 – src2) (->> scale)) |
| 01110 | dest = (src2 – src1) (->> scale) |
| 01111 | dest = SAT((src2 – src1) (->> scale)) |
| 101N0 | dest = (src1 + src2 + Carry) (->> scale) (, N) |
| 111N0 | dest = (src1 – src2 + Carry – 1) (->> scale) (, N) |

Add/subtract accumulate instructions perform addition and subtraction with accumulation and scaling/saturation. Unlike the multiply accumulate instructions the accumulator number cannot be specified independently of the destination register. The bottom two bits of the destination register give the number, acc, of the 40 bit accumulator to accumulate into. Hence ADDA X0,X1,X2,A0 and ADDA A3,X1,X2,A3 are valid, but ADDA X1,X1,X2,A0 is not. With this class of instruction, the result must be written back to a register—the no writeback encodings of the destination field are not allowed.

| 31 30 29 | 28 27 26 | 25 24 | 23 22 21 20 19 | 18 17 | 16 15 14 13 12 | 11 10 9 8 7 6 5 4 3 2 1 0 |
|---|---|---|---|---|---|---|
| 0 0 OPC | 1 0 | Sa F | S D | DEST | S1 R 1 | SRC1 | SRC2 |

Mnemonics:

| | | |
|---|---|---|
| 100N0 | ADD{N} | <dest>, <src1>, <src2>{,<scale>} |
| 110N0 | SUB{N} | <dest>, <src1>, <src2>{,<scale>} |
| 10001 | SADD | <dest>, <src1>, <src2>{,<scale>} |
| 11001 | SSUB | <dest>, <src1>, <src2>{,<scale>} |
| 01110 | RSB | <dest>, <src1>, <src2>{,<scale>} |
| 01111 | SRSB | <dest>, <src1>, <src2>{,<scale>} |
| 101N0 | ADC{N} | <dest>, <src1>, <src2>{,<scale>} |
| 111N0 | SBC{N} | <dest>, <src1>, <src2>{,<scale>} |

The assembler supports the following opcodes
  CMP<src1>, <src2>
  CMN<src1>, <src2>
CMP is a subtract which sets the flags with the register write disabled. CMN is an add which sets the flags with register write disabled.
Flags:
  These have been discussed above.
Reasons for inclusion:
ADC is useful for inserting carry into the bottom of a register following a shift/MAX/MIN operation. It is also used to do a 32/32 bit divide. It also provides for extended precision adds. The addition of an N bit gives finer control of the flags, in particular the carry. This enables a 32/32 bit division at 2 cycles per bit.
Saturated adds and subtracts are needed for G.729 etc.
Incrementing/decrementing counters. RSB is useful for calculating shifts (x=32-x is a common operation). A saturated RSB is needed for saturated negation (used in G.729).

OPC specifies the type of instruction. In the following acc is (DEST[1:0]). The Sa bit indicates saturation.
Action (OPC):

| | |
|---|---|
| 0 | dest = {SAT}(acc + (src1 + src2)) {->> scale} |
| 1 | dest = {SAT}(acc + (src1 – src2)) {->> scale} |

Mnemonics:

| | | |
|---|---|---|
| 0 | {S}ADDA | <dest>, <src1>, <src2>, <acc> {,<scale>} |
| 1 | {S}SUBA | <dest>, <src1>, <src2>, <acc> {,<scale>} |

An S before the command indicates saturation.
Flags:
  See above.
Reasons for inclusion:
The ADDA (add accumulate) instruction is useful for summing two words of an array of integers with an accumulator (for instance to find their average) per cycle. The SUBA (subtract accumulate) instruction is useful in calculating the sum of the differences (for correlation); it subtracts two separate values and adds the difference to a third register. Addition with rounding can be done by using <dest> different from <acc>. For example, X0=(X1+X2+16384)>>15 can be done in one cycle by keeping 16384 in A0. Addition with a rounding constant can be done by ADDA X0,X1, #16384,A0.
For a bit exact implementation of:
  sum of ((a_i * b_i)>>k) (quite common—used in TrueSpeech) the standard Piccolo code would be:
    MUL t1, a_0, b_0, ASR#k ADD ans, ans, t1
MUL t2, a_1, b_1, ASR#k
ADD ans, ans, t2

There are two problems with this code; it is too long and the adds are not to 40-bit precision so guard bits can't be used. A better solution is to use ADDA:

MUL t1, a_0, b_0, ASR#k
MUL t2, a_1, b_1, ASR#k
ADDA ans, t1, t2, ans

This gives a 25% speed increase and retains 40-bit accuracy.

Add/Subtract in Parallel instructions perform addition and subtraction on two signed 16-bit quantities held in pairs in 32-bit registers. The primary condition code flags are set from the result of the most significant 16 bits, the secondary flags are updated from the least significant half. Only 32-bit registers can be specified as the source for these instructions, although the values can be halfword swapped. The individual halves of each register are treated as signed values. The calculations and scaling are done with no loss of precision. Hence ADDADD X0, X1, X2, ASR#1 will produce the correct averages in the upper and lower halves of X0. Optional saturation is provided for each instruction for which the Sa bit must be set.

| 31 30 | 29 28 27 26 25 | 24 | 23 | 22 21 20 19 18 | 17 | 16 | 15 14 13 12 11 | 10 9 8 7 6 5 4 3 2 1 0 |
|---|---|---|---|---|---|---|---|---|
| 0 0 | OPC | Sa | F | S D | DEST | S1 | R1 | SRC1 | SRC2 |

OPC defines the operation.
Action (OPC):
 000 dest.h=(src1.h+src2.h) ->> {scale},
   dest.l=(src1.l+src2.l) ->> {scale}
 001 dest.h=(src1.h+src2.h) ->> {scale},
   dest.l=(src1.l−src2.l) ->> {scale}
 100 dest.h=(src1.h−src2.h) ->> {scale},
   dest.l=(src1.l+src2.l) ->> {scale}
 101 dest.h=(src1.h−src2.h) ->> {scale},
   dest.l=(src1.l−src2.l) ->> {scale}

Each sum/difference is independently saturated if the Sa bit is set.

Mnemonics:

| | | |
|---|---|---|
| 000 | {S}ADDADD | <dest>, <src1_32>, <src2_32> {,<scale>} |
| 001 | {S}ADDSUB | <dest>, <src1_32>, <src2_32> {,<scale>} |
| 100 | {S}SUBADD | <dest>, <src1_32>, <src2_32> {,<scale>} |
| 101 | {S}SUBSUB | <dest>, <src1_32>, <src2_32> {,<scale>} |

An S before the command indicates saturation.
The assembler also supports

| | |
|---|---|
| CMNCMN | <dest>, <src1_32>, <src2_32> {,<scale>} |
| CMNCMP | <dest>, <src1_32>, <src2_32> {,<scale>} |
| CMPCMN | <dest>, <src1_32>, <src2_32> {,<scale>} |
| CMPCMP | <dest>, <src1_32>, <src2_32> {,<scale>} | generated by the standard instructions with no write-back.

Flags:

C is set if there is a carry out of bit 15 when adding the two upper sixteen bit halves.

Z is set if the sum of the upper sixteen bit halves is 0.

N is set if the sum of the upper sixteen bit halves is negative.

V is set if the signed 17 bit sum of the upper sixteen bit halves will not fit into 16 bits (post scale).

SZ, SN, SV, and SC are set similarly for the lower 16-bit halves.

Reason for inclusion:

The parallel Add and Subtract instructions are useful for performing operations on complex numbers held in a single 32-bit register. They are used in the FFT kernel. It is also useful for simple addition/subtraction of vectors of 16-bit data, allowing two elements to be processed per cycle.

The Branch (conditional) instruction allows conditional changes in control flow. Piccolo may take three cycles to execute a taken branch.

| 31 | 30 29 28 27 26 | 25 24 23 | 22 21 20 | 19 18 17 16 15 14 13 12 11 10 9 8 7 6 5 4 | 3 2 1 0 |
|---|---|---|---|---|---|
| 0 | 11111 | 100 | 000 | IMMEDIATE_16 | COND |

Action:

Branch by offset if <cond> holds according to the primary flags.

The offset is a signed 16-bit number of words. At the moment the range of the offset is restricted to −32768 to +32767 words.

The address calculation performed is target address=branch instruction address+4+OFFSET Mnemonics:

B<cond> <destination_label>

Flags:

Unaffected.

Reasons for inclusion:

Highly useful in most routines.

Conditional Add or Subtract instructions conditionally add or subtract src2 to src1.

| 31 30 29 28 27 | 26 25 24 23 22 21 20 19 | 18 17 | 16 15 14 13 12 | 11 10 9 8 7 6 5 4 3 2 1 0 |
|---|---|---|---|---|
| 1 0010 | OPC | F | SD | DEST | S1 | R1 | SRC1 | SRC2 |

OPC specifies the type of instruction.
Action (OPC):

| 0 | if (carry set) temp=src1−src2 else temp=src1+src2<br>dest = temp {−>> scale} |
| 1 | if (carry set) temp=src1−src2 else temp=src1+src2<br>dest = temp {−>> scale} BUT if scale is a shift left then the new value of carry (from src1−src2 or src1+src2) is shifted into the bottom. |

Mnemonics:

| 0 | CAS  | <dest>, <src1>, <src2> {,<scale>} |
| 1 | CASC | <dest>, <src1>, <src2> {,<scale>} |

Flags:
  See above.
Reasons for inclusion:

The Conditional Add or Subtract instruction enables efficient divide code to be constructed.
Example 1: Divide the 32-bit unsigned value in X0 by the 16-bit unsigned value in X1 (with the assumption that X0<(X1<<16) and X1.h=0).

```
LSL   X1, X1, #15        ; shift up divisor
SUB   X1, X1, #0         ; set the carry flag
REPEAT #16
CASC  X0, X0, X1, LSL#1
NEXT
```

At the end of the loop X0.1 holds the quotient of the divide. The remainder can be recovered from X0.h depending on the value of carry.
Example 2: Divide the 32-bit positive value in X0 by the 32-bit positive value in X1, with early termination.

```
MOV     X2, #0              ; clear the quotient
LOG     Z0, X0              ; number of bits X0 can be shifted
LOG     Z1, X1              ; number of bits X1 can be shifted
SUBS    Z0, Z1, Z0          ; X1 shift up so 1's match
BLT     div_end             ; X1>X0 so answer is 0
LSL     X1, X1, Z0          ; match leading ones
ADD     Z0, Z0, #1          ; number of tests to do
SUBS    Z0, Z0, #0          ; set carry
REPEAT  Z0
CAS     X0, X0, X1, LSL#1
ADCN    X2, X2, X2
NEXT
div_end
```

At the end, X2 holds the quotient and the remainder can be recovered from X0.

The Count Leading Bits instruction allows data to be normalised.

| 31 30 29 28 27 26 25 24 | 23 22 21 20 19 | 18 17 | 16 15 14 13 12 | 11 10 9 8 7 6 5 4 3 2 1 0 |
|---|---|---|---|---|
| 011011 | F | SD | DEST | S1 | R1 | SRC1 | 101110000000 |

Action:
  dest is set to the number of places the value in src1 must be shifted left in order for bit 31 to differ from bit 30. This is a value in the range 0–30 except in the special cases where src1 is either −1 or 0 where 31 is returned.
Mnemonic:
  CLB <dest>, <src1>
Flags:
  Z is set if the result is zero.
  N is cleared.
  C is set if src1 is either −1 or 0.
  V is preserved.
Reasons for inclusion:
Step needed for normalisation.

Halt and Breakpoint instructions are provided for stopping Piccolo execution

| 31 | 30 29 28 27 26 | 25 24 23 | 22 21 | 20 19 18 17 16 15 14 13 12 11 10 9 8 7 6 5 4 3 2 1 0 |
|---|---|---|---|---|
| 1 | 11111 | 11 | OP | 00000000000000000000000 |

OPC specifies the type of instruction.

Action (OPC):

| | |
|---|---|
| 0 | Piccolo execution is stopped and the Halt bit is set in the Piccolo status register. |
| 1 | Piccolo execution is stopped, the Break bit is set in the Piccolo status register and the ARM is interrupted to say that a breakpoint has been reached. |

| 31 30 29 28 | 27 26 25 | 24 | 23 22 21 20 19 | 18 17 | 16 15 14 13 12 | 11 10 9 8 7 6 5 4 3 2 1 0 |
|---|---|---|---|---|---|---|
| 0 101 | OPC 1 | F SD | DEST | S1 R1 | SRC1 | SRC2 |

Mnemonics:

| | |
|---|---|
| 0 | HALT |
| 1 | BREAK |

Flags:
 Unaffected

Logical Operation instructions perform a logical operation on a 32 or 16-bit register. The operands are treated as unsigned values.

| 31 30 29 28 27 26 25 | 24 | 23 22 21 20 19 | 18 17 | 16 15 14 13 12 | 11 10 9 8 7 6 5 4 3 2 1 0 |
|---|---|---|---|---|---|
| 1 000 OPC | F SD | DEST | S1 R1 | SRC1 | SRC2 |

OPC encodes the logical operation to perform.

Action (OPC):

| | |
|---|---|
| 00 | dest = (src1 & src2) {->> scale} |
| 01 | dest = (src1 \| src2) {->> scale} |
| 10 | dest = (src1 & ~src2) {->> scale} |
| 11 | dest = (src1 ^ src2) {->> scale} |

Mnemonics:

| | | |
|---|---|---|
| 00 | AND | <dest>, <src1>, <src2> {,<scale>} |
| 01 | ORR | <dest>, <src1>, <src2> {,<scale>} |
| 10 | BIC | <dest>, <src1>, <src2> {,<scale>} |
| 11 | EOR | <dest>, <src1>, <src2> {,<scale>} |

The assembler supports the following opcodes

| | |
|---|---|
| TST | <src1>, <src2> |
| TEQ | <src1>, <src2> |

TST is an AND with the register write disabled. TEQ is an EOR with the register write disabled.

Flags:

Z is set if the result is all zeros
N, C, V are preserved
SZ, SN, SC, SV are preserved Reasons for inclusion:

Speech compression algorithms use packed bitfields for encoding information. Bitmasking instructions help for extracting/packing these fields.

Max and Min Operation instructions perform maximum and minimum operations.

OPC specifies the type of instruction.

Action (OPC):

| | |
|---|---|
| 0 | dest = (src1 <= src2) ? src1 : src2 |
| 1 | dest = (src1 > src2) ? src1 : src2 |

Mnemonics:

| | |
|---|---|
| 0 | MIN <dest>, <src1>, <src2> |
| 1 | MAX <dest>, <src1>, <src2> |

Flags:

| | |
|---|---|
| Z | is set if the result is zero |
| N | is set if the result is negative |
| C | For Max: C is set if src2>=src1 (src1 (dest=src1 case) For Min: C is set if src2>=src1 (dest=src2 case) |
| V | preserved. |

Reasons for inclusion:

In order to find the strength of a signal many algorithms scan a sample to find the minimum/maximum of the absolute value of the samples. The MAX and MIN operations are invaluable for this. Depending on whether you wish to find the first or last maximum in the signal the operands src1 and src2 can be swapped around.

MAX X0, X0, #0 will convert X0 to a positive number with clipping below.

MIN X0, X0, #255 will clip X0 above. This is useful for graphics processing.

Max and Min Operations in Parallel instructions perform maximum and minimum operations on parallel 16-bit data.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 111 | | OP | 1 | F | SD | | DEST | | | | | S1 | R1 | | SRC1 | | | | | | | SRC2_PARALLEL | | | | | | | | |

OPC specifies the type of instruction.

Action (OPC):

| 0 | dest.1 = (src1.1 <= src2.1) ? src1.1 : src2.1 |
| | det.h = (src1.h <= src2.h) ? src1.h : src2.h |
| 1 | dest.1 = (src1.1 > src2.1) ? src1.1 : src2.1 |
| | dest.h = (src1.h > src2.h) ? src1.h : src2.h |

Mnemonics:

| 0 | MINMIN | <dest>, <src1>, <src2> |
| 1 | MAXMAX | <dest>, <src1>, <src2> |

Flags:

| Z | is set if the upper 16 bits of the result is zero |
| N | is set if the upper 16 bits of the result is negative |
| C | For Max: C is set if src2.h>=src1.h (dest=src1 case) |
| | For Min: C is set if src2.h>=src1.h (dest=src2 case) |
| V | preserved. |
| SZ, SN, SC, SV are set similarly for the lower 16-bit halves. | |

Reasons for inclusion:
As for 32-bit Max and Min.

Move Long Immediate Operation instructions allow a register to be set to any signed 16-bit, sign extended value. Two of these instructions can set a 32-bit register to any value (by accessing the high and low half in sequence). For moves between registers see the select operations.

The assembler will provide a non-interlocking NOP operation using this MOV instruction, i.e. NOP is equivalent to MOV , #0.

Flags:

Flags are unaffected.

Reasons for inclusion:

Initialising registers/counters.

Multiply Accumulate Operation instructions perform signed multiplication with accumulation or de-accumulation, scaling and saturation.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | | 10 | | OPC | | Sa | F | SD | | DEST | | | A1 | R1 | | SRC1 | | | | | | | SRC2_MULA | | | | | | | | |

The field OPC specifies the type of instruction.
Action (OPC):

| 00 | dest = (acc + (src1 * src2)) {->> scale} |
| 01 | dest = (acc − (src1 * src2)) {->> scale} |

In each case the result is saturated before being written to the destination if the Sa bit is set.

Mnemonics:

| 00 | {S}MULA | <dest>, <src1_16>, <src2_16>, <acc> {,<scale>} |
| 01 | {S}MULS | <dest>, <src1_16>, <src2_16>, <acc> {,<scale>} |

An S before the command indicates saturation.

Flags:
  See section above.

Reasons for inclusion:
A one cycle sustained MULA is required for FIR code. MULS is used in the FFT butterfly. A MULA is also useful for multiply with rounding. For example A0=(X0*X1+16384)>>15 can be done in once cycle by holding 16384 in

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | | 11100 | | | | | F | SD | | DEST | | | | IMMEDIATE_15 | | | | | | | | | | | | | +/− | | 000 | | |

Mnemonics:
  MOV <dest>, #<imm_16> another accumulator (A1 for example). Different <dest> and <acc> is also required for the FFT kernel.

Multiply Double Operation instructions perform signed multiplication, doubling the result prior to accumulation or de-accumulation, scaling and saturation.

| 31 30 29 | 28 27 | 26 25 | 24 | 23 22 21 20 19 | 18 17 | 16 15 14 13 12 | 11 10 9 | 8 7 6 5 4 3 2 1 0 |
|---|---|---|---|---|---|---|---|---|
| 1 10 1 | OPC | 1 F | SD | DEST | A1 R1 | SRC1 | 0 A0 R2 | SRC2 SCALE |

OPC specifies the type of instruction.
Action (OPC):

| 0 | dest = SAT((acc + SAT(2 * src1 * src2)) {->> scale}) |
| 1 | dest = SAT((acc − SAT(2 * src1 * src2)) {->> scale}) |

Mnemonics:

| 0 | SMLDA. | <dest>, <src1_16>, <src2_16>, <acc> {, <scale>} |
| 1 | SMLDS | <dest>, <src1_16>, <src2_16>, <acc> {, <scale>} |

Flags:
See section above.
Reasons for inclusion:
The MLD instruction is required for G.729 and other algorithms which use fractional arithmetic. Most DSPs provide a fractional mode which enables a left shift of one bit at the output of the multiplier, prior to accumulation or writeback. Supporting this as a specific instruction provides more programming flexibility. The name equivalents for some of the G series basic operations are:
L_msu=> SMLDS
L_mac=> SMLDA
These make use of the saturation of the multiplier when left shifting by one bit. If a sequence of fractional multiply-accumulates is required, with no loss of precision, MULA can be used, with the sum maintained in 33.14 format. A left shift and saturate can be used at the end to convert to 1.15 format, if required.

Multiply Operation instructions perform signed multiplication, and optional scaling/saturation. The source registers (16-bit only) are treated as signed numbers.

OPC specifies the type of instruction.

Action (OPC):

| 0 | dest = (src1 * src2) {->> scale} |
| 1 | dest = SAT((src1 * src2) {->> scale}) |

Mnemonics:

| 0 | MUL | <dest>, <src1_16>, <src2> {, <scale>} |
| 1 | SMUL | <dest>, <src1_16>, <src2> {, <scale>} |

Flags:

See section above.

Reasons for inclusion:

Signed and saturated multiplies are required by many processes.

Register List Operations are used to perform actions on a set of registers. The Empty and Zero instructions are provided for resetting a selection of registers prior to, or in between routines. The Output instruction is provided to store the contents of a list of registers to the output FIFO.

| 31 30 29 28 27 | 26 25 | 24 | 23 22 21 20 19 | 18 17 | 16 15 14 13 12 | 11 10 9 8 7 6 5 4 3 2 1 0 |
|---|---|---|---|---|---|---|
| 00011 | OPC | F | SD | DEST | S1 R1 | SRC1 | SRC2 |

| 31 | 30 29 28 27 26 | 25 | 24 23 22 21 | 20 19 | 18 17 16 15 14 13 12 11 10 9 8 7 6 5 4 | 3 2 1 0 |
|---|---|---|---|---|---|---|
| 1 | 11111 | 0 | OPC | 00 | REGISTER_LIST_16 | SCALE |

OPC specifies the type of instruction.

Action (OPC):

```
000   for (k=0; k<16; k++)
          if bit k of the register list is set then register k is
marked as being empty.
001   for (k=0; k<16; k++)
          if bit k of the register list is set then register k is set
          to contain 0.
010   Undefined
011   Undefined
100   for (k=0; k<16; k++)
          if bit k of the register list is set then
          (register k ->> scale) is written to the output FIFO.
101   for (k=0; k<16; k++)
          if bit k of the register list is set then
          (register k ->> scale) is written to the output FIFO and
          register k is marked as being empty.
110   for (k=0; k<16; k++)
          if bit k of the register list is set then
          SAT(register k ->> scale) is written to the output FIFO.
111   for (k=0; k<16; k++)
          if bit k of the register list is set then
          SAT(register k ->> scale) is written to the output FIFO and
          register k is marked as being empty.
```

In each case it will output one register using a MOV ^, Rn instruction.

The EMPTY instruction will stall until all registers to be empties contain valid data (i.e. are not empty).

Register list operations must not be used within re-mapping REPEAT loops.

The OUTPUT instruction can only specify up to eight registers to output.

Reasons for inclusion:

After a routine has finished, the next routine expects all registers to be empty so it can receive data from the ARM. An EMPTY instruction is needed to accomplish this. Before performing a FIR or other filter all accumulators and partial results need to be zeroed. The ZERO instruction helps with this. Both are designed to improve code density by replacing a series of single register moves. The OUTPUT instruction is included to improve code density by replacing a series of MOV ^, Rn instructions.

A Remapping Parameter Move Instruction RMOV is provided to allow the configuration of the user defined register re-mapping parameters.

The instruction encoding is as follows:

| 31 | 30 29 28 27 26 | 25 24 23 | 22 21 | 20 19 18 17 14 13 | 13 12 11 10 9 8 7 | 6 5 4 3 2 1 0 |
|---|---|---|---|---|---|---|
| 1 | 11111 | 101 | 00 | ZPARAMS | YPARAMS | XPARAMS |

Mnemonics:

```
000   EMPTY     <register_list>
001   ZERO      <register_list>
010   Unused
011   Unused
100   OUTPUT    <register_list>{, <scale>}
101   OUTPUT    <register_list>{, <scale>}
110   SOUTPUT   <register_list>{, <scale>}
111   SOUTPUT   <register_list>{, <scale>}
```

Flags:
  Unaffected
Examples:

```
EMPTY    {A0, A1, X0–X3}
ZERO     {Y0–Y3}
OUTPUT   {X0–Y1}
```

The assembler will also support the syntax

```
OUTPUT                       Rn
```

Each PARAMS field is comprised of the following entries:

| 6 | 5 4 | 3 2 | 1 0 |
|---|---|---|---|
| BASEWRAP | BASEINC | 0 | RENUMBER |

The meaning of these entries is described below

| PARAMETER | DESCRIPTION |
|---|---|
| RENUMBER | Number of 16-bit registers to perform re-mapping on, may take the values 0, 2, 4, 8. Registers below RENUMBER are re-mapped, those above are accessed directly. |
| BASEINC | The amount the base pointer is incremented at the end of each loop. May take the values 1, 2, or 4. |
| BASEWRAP | The base wrapping modulus may take the values 2, 4, 8. |

Mnemonics:
   RMOV <PARAMS>, [<PARAMS>]
The <PARAMS> field has the following format:
   <PARAMS>    ::= <BANK><BASEINC>
      n<RENUMBER>w<BASEWRAP>
   <BANK>    ::=[X|Y|Z]
   <BASEINC> ::=[++|+1|+2|+4]
   <RENUMBER> ::=[0|2|4|8]
   <BASEWRAP> ::=[2|4|8]

If the RMOV instruction is used whilst re-mapping is active, the behaviour will depend upon the particular hardware implementation and cannot be relied upon by a programmer.

Flags:
   Unaffected

Repeat Instructions provide four zero cycle loops in hardware. The REPEAT instruction defines a new hardware loop. Piccolo uses hardware loop 0 for the first REPEAT instruction, hardware loop 1 for a REPEAT instruction nested within the first repeat instruction and so on. The REPEAT instruction does not need to specify which loop is being used. REPEAT loops must be strictly nested. If an attempt is made to nest loops to a depth greater than 4 then the behaviour is unpredictable.

Each REPEAT instruction specifies the number of instructions in the loop (the loop instructions immediately following the REPEAT instruction) and the number of times to go around the loop (which is either a constant or read from a Piccolo register).

If the number of instructions in the loop is small (1 or 2) then Piccolo may take extra cycles to set the loop up.

If the loop count is register-specified, a 32-bit access is implied (S1=1), though only the bottom 16 bits are significant and the number is considered to be unsigned. If the loop count is zero, then the action of the loop depends upon the particular hardware implementation and cannot be relied upon by a programmer. A copy of the loop count is taken so the register can be immediately reused (or even refilled) without affecting the loop.

The REPEAT instruction provides a mechanism to modify the way in which register operands are specified within a loop. The details are described above.

Encoding of a REPEAT with a register specified number of loops:

| RFIELD | BASEINC | RENUMBER | BASEWRAP | Mnemonic {X,Y,Z} |
|---|---|---|---|---|
| 0 | — | 000 | — | No remapping |
| 1 | — | — | — | User defined parameters |
| 2 | 1 | 880 | 0 | X++n8, Y++n8 |
| 3 | 1 | 800 | 0 | X++n8 |
| 4 | 1 | 440 | 0 | X++n4, Y++n4 |
| 5 | 1 | 400 | 0 | X++n4 |
| 6 | 1 | 220 | 0 | X++r12, Y++1 |
| 7 |   |     |   |   |
| 8 | 2 | 880 | 0 | X+2n8, Y+2n8 |
| 9 | 2 | 800 | 0 | X+2n8 |
| 10 | 2 | 440 | 0 | X+2n4, Y+2n4 |
| 11 | 2 | 400 | 0 | X+2n4 |
| 12 | 1 | 820 | 0 | X++n8, Y++n2 |
| 13 | 1 | 444 | 0 | X++n4, Y++n4, Z++n4 |
| 14 | — | — | — | Reserved |
| 15 | — | — | — | Reserved |

The assembler provides two opcodes REPEAT and NEXT for defining a hardware loop. The REPEAT goes at the start of the loop and the NEXT delimits the end of the loop, allowing the assembler to calculate the number of instructions in the loop body. For the REPEAT it is only necessary to specify the number of loops either as a constant or register. For example:

```
REPEAT    X0
MULA      A0, Y0.1, Z0.1, A0
MULA      A0, Y0.h, Z0.h, A0
NEXT
```

This will execute the two MULA instructions X0 times. Also,

```
REPEAT    #10
MULA      A0, X0, Y0, A0
NEXT
``` will perform 10 multiply accumulates.
The assembler supports the syntax:
   REPEAT #iterations [, <PARAMS>]
To specify the re-mapping parameters to use for the REPEAT. If the required remapping parameters are equal to one of the predefined set of parameters, then the appropriate REPEAT encoding is used. If it is not then the assembler will

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 11110 | | | | | 0 | RFIELD_4 | | | | 00 | | 0 | R1 | SRC1 | | | | | 0000 | | | | #INSTRUCTIONS_8 | | | | | | | |

Encoding of REPEAT with a fixed number of loops:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 11110 | | | | | 1 | RFIELD_4 | | | | #LOOPS_13 | | | | | | | | | | | | | #INSTRUCTIONS_8 | | | | | | | |

The RFIELD operand specifies which of 16 re-mapping parameter configurations to use inside the loop.

followed by a REPEAT instruction. See the section above for details of the RMOV instruction and the re-mapping parameters format.

If the number of iterations for a loop is 0 then the action of REPEAT depends upon the particular hardware implementation and cannot be relied upon by a programmer.

If the number of instructions field is set to 0 then the action of REPEAT depends upon the particular hardware implementation and cannot be relied upon by a programmer.

A loop consisting of only one instruction, with that instruction being a branch will have behaviour that depends upon the particular hardware implementation and cannot be relied upon by a programmer.

Branches within the bounds of a REPEAT loop that branch outside the bounds of that loop will have a result that depends upon the particular hardware implementation and cannot be relied upon by a programmer.

The Saturating Absolute instruction calculates the saturated absolute of source 1.

-continued

| | | |
|---|---|---|
| 10 | If <cond> holds for the primary flags | else dest.1=src2.1. then dest.h=src1.h else dest.h=src2.h, |
| | If <cond> fails for the secondary flags | then dest.1=src1.1 else dest.1=src2.1. |
| 11 | Reserved | |

Mnemonics

| | | |
|---|---|---|
| 00 | SEL<cond> | <dest>, <src1>, <src2> |
| 01 | SELTT<cond> | <dest>, <src1>, <src2> |
| 10 | SELTF<cond> | <dest>, <src1>, <src2> |
| 11 | Unused | |

| 31 30 29 28 27 | 26 25 24 | 23 | 22 | 21 20 19 | 18 17 | 16 15 14 13 12 | 11 10 9 8 7 6 5 4 3 2 1 0 |
|---|---|---|---|---|---|---|---|
| 0 | 10011 | F | SD | DEST | S1 R1 | SRC1 | 100000000000 |

Action:

dest=SAT((src1 >=0) ? src1:-src1). The value is always saturated. In particular the absolute value of 0x80000000 is 0x7fffffff and NOT 0x80000000!

Mnemonic:

SABS <dest>, <src1>

Flags:

Z is set if the result is zero.

N is preserved.

C is set of src1<0 (dest=-src1 case)

V is set if saturation occured.

Reasons for inclusion:

Useful in many DSP applications.

Select Operations (Conditional Moves) serve to conditionally move either source 1 or source 2 into the destination register. A select is always equivalent to a move. There are also parallel operations for use after parallel adds/subtracts.

Note that both source operands may be read by the instruction for implementation reasons and so if either one is empty the instruction will stall, irrespective of whether the operand is strictly required.

If a register is marked for refill, it is unconditionally refilled. The assembler also provides the mnemonics:

| | |
|---|---|
| MOV<cond> | <dest>, <src1> |
| SELFT<cond> | <dest>, <src1>, <src2> |
| SELFF | <cond>, <src1>, <src2> |

MOV<cond> A,B is equivalent to SEL<cond> A, B, A. SELFT and SELFF are obtained by swapping src1 and src2 and using SELTF, SELTT.

Flags:

All flags are preserved so that a sequence of selects may be performed.

Reasons for inclusion:

Used for making simple decisions inline without having to resort to a branch. Used by Viterbi algorithms and when scanning a sample or vector for the largest element.

Shift Operation instructions provide left and right logical shifts, right arithmetic shifts, and rotates by a specified amount. The shift amount is considered to be a signed integer between −128 and +127 taken from the bottom 8 bits of the register contents or an immediate in the range +1 to +31. A shift of a negative amount causes a shift in the opposite direction by ABS(shift amount).

| 31 30 29 28 27 | 26 25 24 | 23 | 22 | 21 20 19 | 18 17 | 16 15 14 13 12 | 11 10 9 8 7 6 5 4 3 2 1 0 |
|---|---|---|---|---|---|---|---|
| 1 | 011 | OPC | F | SD | DEST | S1 R1 | SRC1 | SRC2_SEL |

OPC specifies the type of instruction.

Action (OPC):

| | | |
|---|---|---|
| 00 | If <cond> holds for primary flags | then dest=src1 else dest=src2. |
| 01 | If <cond> holds for the primary flags | then dest.h=src1.h else dest.h=src2.h, |
| | If <cond> holds for the secondary flags | then dest.1=src1.1 |

The input operands are sign extended to 32-bits; the resulting 32-bit output is sign extended to 40-bits before write back so that a write to a 40-bit register behaves sensibly.

| 31 | 30 29 28 | 27 26 25 | 24 | 23 22 21 20 19 18 17 | 16 15 14 13 12 | 11 10 9 8 7 6 5 4 3 2 1 0 |
|---|---|---|---|---|---|---|
| 1 | 010 | OPC | F | S D | DEST | S1 | R 1 | SRC1 | SRC2_SEL |

OPC specifies the type of instruction.
Action (OPC):

| | |
|---|---|
| 00 | dest = (src2>=0) ?src1 << src2 : src1 >> -src2 |
| 01 | dest = (src2>=0) ?src1 >> src2 : src1 << -src2 |
| 10 | dest = (src2>=0) ?src1 ->> src2 : src1 << -src2 |
| 11 | dest = (src2>=0) ?src1 ROR src2 : src1 ROL -src2 |

Mnemonics:

| | | |
|---|---|---|
| 00 | ASL | <dest>, <src1>, <src2_16> |
| 01 | LSR | <dest>, <src1>, <src2_16> |
| 10 | ASR | <dest>, <src1>, <src2_16> |
| 11 | ROR | <dest>, <src1>, <src2_16> |

Flags:
  Z is set if the result is zero.
  N is set if the result is negative
  V is preserved
  C is set to the value of the last bit shifted out (as on the ARM)
The behaviour of register specified shifts is:
  LSL by 32 has result zero, C set to bit 0 of src1.
  LSL by more than 32 has result zero, C set to zero.
  LSR by 32 has result zero, C set to bit 31 of src1.
  LSR by more than 32 has result zero, C set to zero.
  ASR by 32 or more has result filled with and C equal to bit 31 of src1.
  ROR by 32 has result equal to src1 and C set to bit 31 of src1.
  ROR by n where n is greater than 32 will give the same result and carry out as ROR by n−32; therefore repeatedly subtract 32 from n until the amount is in the range 1 to 32 and see above.
Reasons for inclusion:
Multiplication/division by a power of 2. Bit and field extraction. Serial registers.

Undefined Instructions are set out above in the instruction set listing. Their execution will cause Piccolo to halt execution, and set the U bit in the status register, and disable itself (as if the E bit in the control register was cleared). This allows any future extensions of the instructions set to be trapped and optionally emulated on existing implementations.

Acessing Piccolo State from ARM is as follows. State access mode is used to observe/modify the state of Piccolo. This mechanism is provided for two purposes:
  Context Switch.
  Debug.

Piccolo is put in state access mode by executing the PSTATE instruction. This mode allows all Piccolo state to be saved and restored with a sequence of STC and LDC instructions. When put into state access mode, the use of the Piccolo coprocessor ID PICCOLO1 is modified to allow the state of Piccolo to be accessed. There are 7 banks of Piccolo state. All the data in a particular bank can be loaded and stored with a single LDC or STC.
Bank 0: Private registers.
  1 32-bit word containing the value of the Piccolo ID Register (Read Only).
  1 32-bit word containing the state of the Control Register.
  1 32-bit word containing the state of the Status Register.
  1 32-bit word containing the state of the Program Counter.
Bank 1: General Purpose registers (GPR).
  16 32-bit words containing the general purpose register state.
Bank 2: Accumulators.
  4 32-bit words containing the top 32-bits of the accumulator registers (N.B. duplication with GPR state is necessary for restoration purposes—would imply another write enable on the register bank otherwise).
Bank 3: Register/Piccolo ROB/Output FIFO Status.
  1 32-bit word indicating which registers are marked for refill (2 bits for each 32-bit register).
  8 32-bit words containing the state of the ROB tags (8 7-bit items stored in bits 7 to 0).
  3 32-bit words containing the state of the unaligned ROB latches (bits 17 to 0).
  1 32-bit word indicating which slots in the output shift register contain valid data (bit 4 indicates empty, bits 3 to 0 encode the number of used entries).
  1 32-bit word containing the state of the output FIFO holding latch (bits 17 to 0).
Bank 4: ROB Input Data.
  8 32-bit data values.
Bank 5: Output FIFO Data.
  8 32-bit data values.
Bank 6: Loop Hardware.
  4 32-bit words containing the loop start addresses.
  4 32-bit words containing the loop end addresses.
  4 32-bit words containing the loop count (bits 15 to 0).
  1 32-bit word containing user defined re-mapping parameters and other remapping state.
The LDC instruction is used to load Piccolo state when Piccolo is in state access mode. The BANK field specifies which bank is being loaded.

| 31 30 29 28 | 27 26 25 | 24 | 23 | 22 | 21 | 20 | 19 18 17 16 15 | 14 13 12 | 11 10 9 8 | 7 6 5 4 3 2 1 0 |
|---|---|---|---|---|---|---|---|---|---|---|
| COND | 110 | P | U | 0 | W | 1 | BASE | BANK | PICCOLO1 | OFFSET |

The following sequence will load all Piccolo state from the address in register R0.

```
LDP   B0, [R0], #16 ! ; private registers
LDP   B1, [R0], #64 ! ; load general purpose registers
LDP   B2, [R0], #16 ! ; load accumulators
LDP   B3, [R0], #56 ! ; load Register/ROB/FIFO status
LDP   B3, [R0], #32 ! ; load ROB data
LDP   B5, [R0], #32 ! ; load output FIFO data
LDP   B6, [R0], #52 ! ; load loop hardware
```

The STC instruction is used to store Piccolo state when Piccolo is in state access mode. The BANK field specifies which bank is being stored.

| 31 30 29 28 | 27 26 25 | 24 | 23 | 22 | 21 | 20 | 19 18 17 16 15 | 14 13 12 | 11 10 9 8 | 7 6 5 4 3 2 1 0 |
|---|---|---|---|---|---|---|---|---|---|---|
| COND | 110 | P | U | 0 | W | 0 | BASE | BANK | PICCOLO1 | OFFSET |

The following sequence will store all Piccolo state to the address in register R0

```
STP   B0, [R0], #16 ! ; save private registers
STP   B1, [R0], #64 ! ; save general purpose registers
STP   B2, [R0], #16 ! ; save accumulators
STP   B3, [R0], #56 ! ; save Register/ROB/FIFO status
STP   B4, [R0], #32 ! ; save ROB data
STP   B5, [R0], #32 ! ; save output FIFO data
STP   B6, [R0], #52 ! ; save loop hardware
```

Debug Mode—Piccolo needs to respond to the same debug mechanisms as supported by ARM i.e. software through Demon and Angel, and hardware with Embedded ICE. There are several mechanisms for debugging a Piccolo system:

ARM instruction breakpoints.
Data breakpoints (watchpoints).
Piccolo instruction breakpoints.
Piccolo software breakpoints.

ARM instruction and data breakpoints are handled by the ARM Embedded ICE module; Piccolo instruction breakpoints are handled by the Piccolo Embedded ICE module; Piccolo software breakpoints are handled by the Piccolo core. The hardware breakpoint system will be configurable such that both the ARM and Piccolo will be breakpointed. Software breakpoints are handled by a Piccolo instruction (Halt or Break) causing Piccolo to halt execution, and enter debug mode (B bit in the status register set), and disable itself (as if Piccolo had been disabled with a PDISABLE instruction). The program counter remains valid, allowing the address of the breakpoint to be recovered. Piccolo will no longer execute instructions.

Single stepping Piccolo will be done by setting breakpoint after breakpoint on the Piccolo instruction stream.

Software Debug—The basic functionality provided by Piccolo is the ability to load and save all state to memory via coprocessor instructions when in state access mode. This allows a debugger to save all state to memory, read and/or update it, and restore it to Piccolo. The Piccolo store state mechanism will be non-destructive, that is the action of storing the state of Piccolo will not corrupt any of Piccolo's internal state. This means that Piccolo can be restarted after dumping its state without restoring it again first.

The mechanism to find the status of the Piccolo cache is to be determined.

Hardware Debug—Hardware debug will be facilitated by a scan chain on Piccolo's coprocessor interface. Piccolo may then be put into state access mode and have its state examined/modified via the scan chain.

The Piccolo Status register contains a single bit to indicate that it has executed a breakpointed instruction. When a breakpointed instruction is executed, Piccolo sets the B bit in the Status register, and halts execution. To be able to interrogate Piccolo, the debugger must enable Piccolo and put it into state access mode by writing to its control register before subsequent accesses can occur.

FIG. 4 illustrates a multiplexer arrangement responsive to the Hi/Lo bit and Size bit to switch appropriate halves of the selected register to the Piccolo datapath. If the Size bit indicates 16 bits, then a sign extending circuit pads the high order bits of the datapath with 0s or 1s as appropriate.

SECTION TWO

Figure 8:
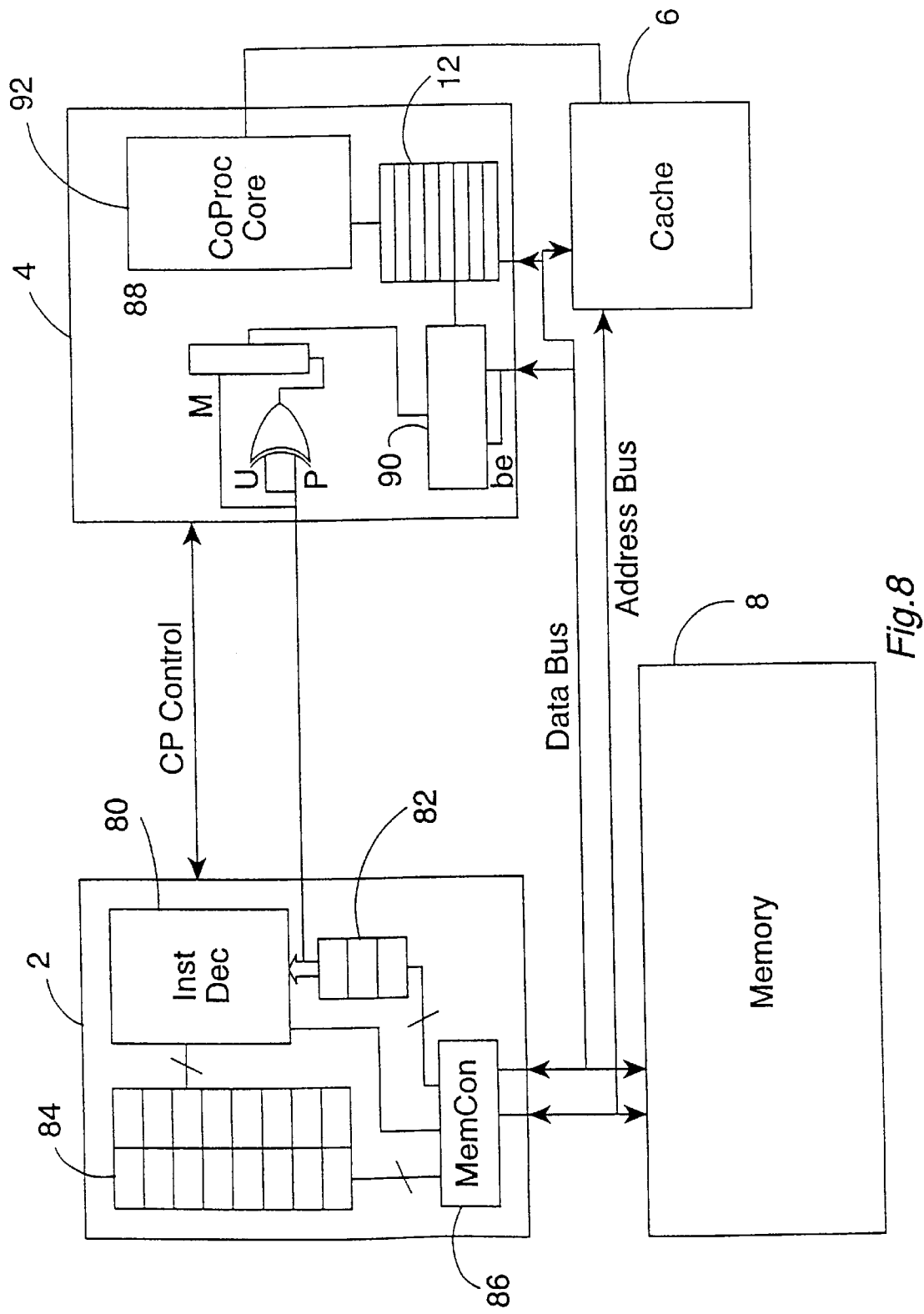
FIG. 8 schematically illustrates a system comprising a central processing unit, a memory and a coprocessor for executing coprocessor memory access instructions.

FIG. 8 illustrates a modified and expanded version of the system of FIG. 1. The central processing unit core 2 includes an instruction decoder 80, an instruction pipeline 82, a register bank 84 and a memory controller 86. In operation, CPU instructions are retrieved from the memory 8 by the memory controller 86 and supplied to the instruction pipeline 82. The instructions progress along the instruction pipeline 82 until they reach the stage adjacent to the instruction decoder 80. At this stage, decoding of the instructions for execution is completed. The instruction decoder 80 is responsive to bit fields within the instruction using logic circuitry to provide control signals that serve to configure and drive the other portions of the central processing unit core 2 to perform the desired data processing operation. In practice, the central processing unit core 2 includes many more functional blocks, such as an arithmetic logic unit, a multiplier, a cache and a memory management unit.

In the present case, when a coprocessor memory access instruction is decoded by the instruction decoder 80, this specifies a register within the register bank 84 that is holding an address value that serves as an address pointer for a memory location within the memory 8. This address value is driven out on the address bus to the memory 8 via the memory controller to initiate a burst mode transfer. The data being transferred is not intended for the central processing unit core 2 but rather is intended for the coprocessor 4. Accordingly, other than generating the appropriate addresses for the memory 8, the central processing unit core 2 does not respond to the data words being asserted on the data bus between the memory 8 and the coprocessor 4. The instruction decoder 80 also generates coprocessor control signals (CP Control) that are passed to the coprocessor 4. These coprocessor control signals indicate to the coprocessor 4 that a coprocessor memory access instruction is being executed and accordingly that the coprocessor 4 should take the appropriate action to either drive data onto the data bus or read data from the data bus. The coprocessor control signals passed to the coprocessor 4 include at least a portion of the addressing mode information in the coprocessor memory access instruction being executed. More particularly, at least the P flag, the U flag and the offset value M are passed to the coprocessor 4.

The coprocessor 4 decodes the P flag and the U flag by performing an exclusive OR (EOR) operation upon these bits. Depending upon the result of this exclusive OR operation, the coprocessor determines whether the number of data words to be transferred in the current burst is specified by the offset value M being passed to it and stored within the register 88 or should be the default value of one data word. The coprocessor transfer controller 90 is responsive to the output of the register 88 and the result of the exclusive OR operation to count the number of data words received on the data bus and when the specified number has been received to assert a burst end signal (be) that is returned to the memory 8 and the central processing unit core 2 to terminate the transfer initiated by the coprocessor memory access instruction being executed. Any data words received form the data bus by the coprocessor 4 are loaded into the reorder buffer 12 before being processed by the coprocessor core 92. As an alternative, the coprocessor 4 could provide the burst length directly to the memory 8 (this is useful for some types of memory, e.g. synchronous DRAM).

Figure 9:
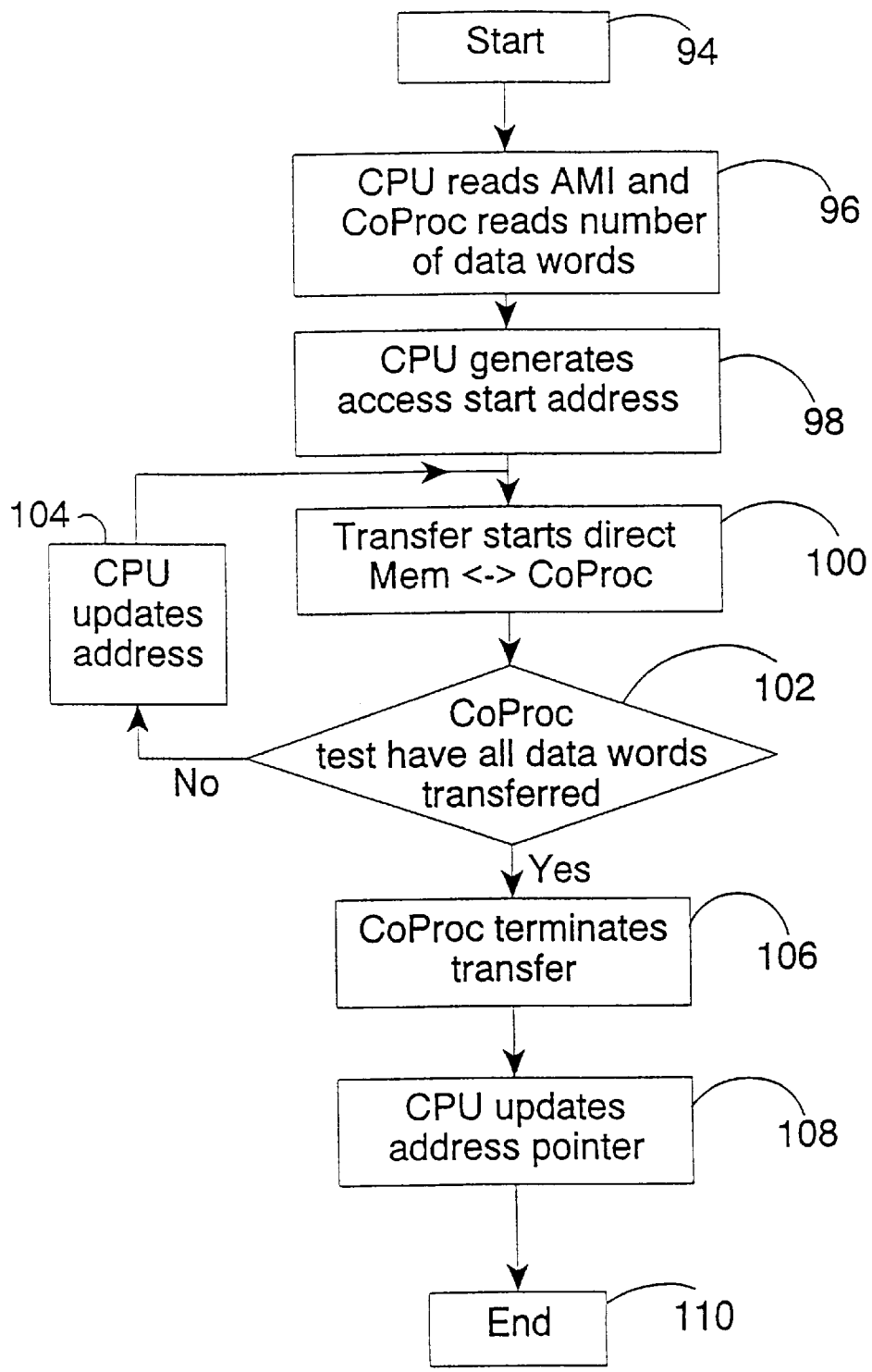
FIG. 9 is a flow diagram corresponding to the operation of the system of FIG. 8.

FIG. 9 schematically illustrates the operation of a coprocessor memory access instruction as discussed above.

The process starts at step 94 and then passes to step 96 where the central processing unit reads the addressing mode information embedded within the coprocessor memory access instruction whilst the coprocessor reads at least a portion of this same addressing mode information to determine therefrom the number of data words in the transfer.

At step 98 the CPU generates the access start address that is supplied to the memory 8. At step 100 the transfer of a data word directly between the memory 8 and the coprocessor 4 takes place. Each time a data word is transferred the coprocessor 4 determines at step 102 whether or not all the data words specified by the coprocessor memory access instruction have been transferred.

If the transfer is not complete, then the operation continues with the central processing unit core 2 performing any necessary update to the address at step 104 and the flow returning to step 100.

If the data transfer is complete, then the system progresses to step 106 where the coprocessor terminates the transfer by asserting the burst end signal (be) that is passed to both the memory 8 and the central processing unit core 2. At step 108 the central processing unit core 2 updates the address pointer in the manner specified by the coprocessor memory access instruction (this could also be done at another point in the process). The process ends at step 110.

In order to improve performance the transfer may take place in a more parallel fashion, e.g. with the coprocessor indicating to the central processing unit whether a second word of data is to be transferred even before transfer of the first word starts.

There follows a detailed description of various coprocessor memory access instructions operating in accordance with one embodiment of the present invention. The overall operation of these instructions from the point of view of the control of the number of data words transferred may be summarised as falling into one of the following address transfer modes in dependence upon the decoding of the P flag and the U flag:

|  | Transfer Start Address Value | Final Value in Address Register | Number of Data Words Transferred |
| --- | --- | --- | --- |
| (i) | Rn | Rn−(WL*M) | 1 |
| (ii) | Rn | Rn | M |
| (iii) | Rn | Rn+(WL*M) | M |
| (iv) | Rn−(WL*M) | Rn | M |
| (v) | Rn−(WL*M) | Rn−(WL*M) | M |
| (vi) | Rn+(WL*M) | Rn | 1 |
| (vii) | Rn+(WL*M) | Rn+(WL*M) | 1 |

An additional possibility is to make the number of words transferred 1 when the base register is the ARM program counter register (PC or R15). This would modify the logic for determining a single word transfer to P EOR (U or (base register is PC)).

Loading the reorder buffer with data from memory
Summary of formats
Two major instruction formats are provided for filling the reorder buffer with data from memory:
 LDP
 LPM
Both instruction formats are encoded as ARM LDC instructions. The LDP instruction class always transfer only one 32-bit data word from memory. The LPM instruction class may be used to transfer multiple words. At the level of the instructions bit pattern, LDP and LPM are distinguished by the addressing mode bits used; the assembler syntax uses different mnemonics for LDP and LPM as a reminder to people writing or reading the code about whether a single or multiple word transfer is referred to. The following formats are available for the two instructions:

| LDP{cond}[32\|16] | dest, address |
| LDP{cond}16U | bank, address |
| LPM{cond}[A\|D][32\|16] | Rn{!}, [<Rlist>]{,#<wordcount>} |
| LPM{cond}[A\|D]16 | Rn{!}, <bank0.1>, #<wordcount> | where:
{ } indicates an optional field.
cond is the ARM instruction condition code field.
32¦16 indicates whether the data being loaded should be
 treated as 16-bit data, and endianess-specific action taken
 (see earlier description in relation to STP16 and STP32),
 or as 32-bit data.
dest specifies the Piccolo destination register (A0–Z3).
address can be:

[Rn]
[Rn, #+ve_offset]{!}
[Rn], #−ve_offset

Rn is an expression evaluating to a valid ARM register number.

! indicates that the calculated address should be written back to the base register.

+ve_offset is an expression evaluating to an offset which can be expressed as +<8_bit_offset>*4. This offset is added to the base register to form the load address, i.e. the address is pre-indexed.

−ve_offset is an expression evaluating to an offset which can be expressed as −<8_bit_offset>*4. The load address is the value of the base register Rn; the offset is subtracted from Rn and the result is written back to Rn.

bank specifies one of the three non-accumulator Piccolo banks (X¦Y¦Z).

A¦D indicates pre-increment (ascending) or post-decrement (descending) addressing modes.

<Rlist> is an ascending list of Piccolo register numbers, enclosed in '{ }'. E.g. {X0, X1}. For the first version of Piccolo at most 8 registers can be specified. The list may wrap round through the top of the register bank. E.g. {Y2,Y3,A0,A1} is a valid register list.

bank0.1 specifies one of the four 16-bit Piccolo registers (A0.1¦X0.1¦Y0.1¦Z0.1).

wordcount is used to perform wrapping loads on a selected range of registers, it specifies the total number of data items transferred. For the first version of Piccolo, no more than 8 items of data can be transferred in one LPM instruction.

When the <list> format is used, the list of registers specified by <list> must start with one of (A0,X0,Y0,Z0) and the register list can only specify 1, 2 or 4 registers; i.e. only
{X0}
{X0,X1}
{X0,X1,X2,X3}
are valid <Rlist> combinations for the X bank of registers. <wordcount> must be larger than length(Rlist). This format of the LPM instruction will transfer a total of <wordcount> data items, tagging them in turn for each register in <Rlist> with wrapping to the start of <Rlist> when the end of the list is reached.

When the <bank0.1> format is used, <wordcount> can be in the range (1–8) for the first version of Piccolo. This format of the LPM instruction will load 2*<wordcount> 16-bit data items, tagging all data for the register <bank0.1>.

EXAMPLES

| LDPNE32 A1, [R0] | ; load A1 with mem(R0) if Z flag = 0 |
| | ; Treat data as 32-bit. |
| LDP16 X0, [R0, #16]! | ; load X0 with |
| | ; mem(R0+16(bytes)), with |
| | ; write back of R0 + 16 to R0. |
| | ; Treat data as packed 16-bit. |

-continued

| LDP32 Y2, [R0], #−4 | ; Load Y2 with |
| | ; mem(R0), write back |
| | ; (R0−#4) to R0. |
| LDP16U X, [R0, #4] | ; prime X-bank unaligned latch |
| | ; with mem(R0+#4(bytes)). |
| LPMEQA32 R0!, {X2, X3, Y0, Y1} | ; if Z flag = 1, then load 4 words |
| | ; ascending in memory |
| | ; from [R0] tagging them for |
| | ; registers X2, X3, Y0, |
| | ; Y1. Write back to R0. |
| PMA16 R1!, {X0, X1}, #8 | ; load 8 words of packed 16-bit data ascending in memory |
| | ; from [R1], tagging them for |
| | ; registers X0, X1, X0, X1, X0, |
| | ; X1, X0, X1. |

Instruction encoding

LDP instructions

LDP instructions transfer one 32-bit word from memory. Some of these instructions perform writebacks, but, in accordance with the assembler syntax, are not marked with a "!" since post-indexing always implies writeback. There are two variants:

| LDP{cond}[32\|16] | dest, [Rn], #−ve_offset |
| LDP{cond}[32\|16] | dest, [Rn, #+ve_offset]{!} |

The addressing mode is determined by the P, U and W bits. These are the bits 24, 23 and 21 respectively within the instructions.

The combination P=0, U=0 and W=1 is used to encode instructions of the form

| LDP{cond}[32\|16] | dest, [Rn], #−ve_offset |

Only one word is transferred from the address [Rn]. The base register is decremented by 8_bit_offset*4 after the transfer has occurred. The N bit specifies either LDP32 (1) or LDP16 (0). <8_bit_offset> encodes mod(#−ve_offset)/4. This particular instruction is useful for striding backwards through data structures extracting one particular word at each occurrence. Analogous desired function are matched by others of the instructions.

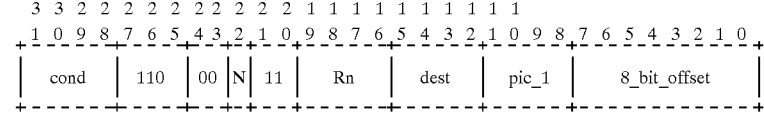

The combination P=1, U=1 is used to encode instructions of the form

| LDP{cond}[32\|16] | dest, [Rn, #+ve_offset]{!} |

Only one word is transferred from the address [Rn+#+ve_offset]. If the W bit is set, the base register is incremented by 8_bit_offset*4, i.e. the form with writeback as indicated by the optional "!" being present. If W=0 then no writeback takes place and "!" would be absent. The N bit specifies either LDP32 (1) or LDP16(0). <8_bit_offset> encodes #+ve_offset/4. Pic_1 (and Pic_2 referred to later) are identifying numbers that identify that the coprocessor is a Piccolo coprocessor. Piccolo has two identifying numbers that can be used depending upon the instruction concerned.

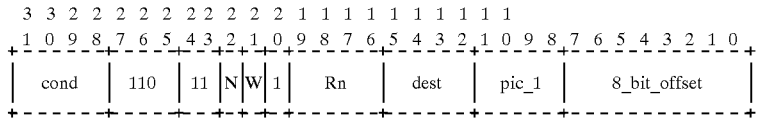

LDP16U

The LDP16U instruction is used to prime one of the three unaligned holding latches. It has the following variants:

| | |
|---|---|
| LDP{cond}U16 | bank, [Rn], #−ve_offset |
| LDP{cond}U16 | bank, [Rn, #+ve_offset]{!} |

The addressing mode is determined by the P and U bits. The combination P=0, U=0 and W=1 is used to encode instructions of the form

| | |
|---|---|
| LDP{cond}U16 | dest, [Rn], #−ve_offset |

Only one word is transferred from the address [Rn]. After the transfer the base register is modified by #−ve_offset.

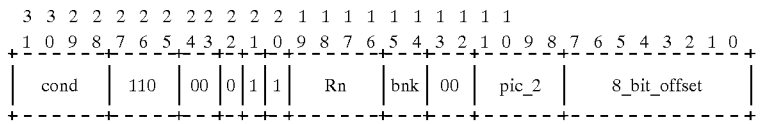

<bnk> specifies the bank to turn on unaligned mode for. It can take the values 1–3 for banks X, Y or Z.

The combination of P=1 and U=1 is used to encode instructions of the form

| | |
|---|---|
| LDP{cond}U16 | dest, [Rn, #+ve_offset]{!} |

Only one word is transferred from the address [Rn+#+ve_offset]. If the W bit is set, the base register is modified by #+ve_offset. If W=0 there is no writeback.

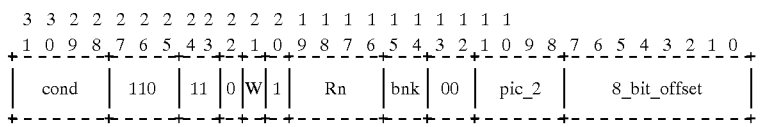

<bnk> specifies the bank to turn on unaligned mode for. It can take the values 1–3 for banks X, Y or Z.

LPM instructions

LPM instructions transfer multiple words from memory. It has the following variants:

| | |
|---|---|
| LPM{cond}[A\|D][32\|16] | Rn{!}, [<Rlist>] |
| LPM{cond}[A\|D][32\|16] | Rn{!}, [<Rlist>], #<wordcount> |
| LPM{cond}[A\|D]16 | Rn{!}, <bank0.1>, #<wordcount> |

For the LPMA variants P=0, U=1 and the instruction is encoded as:

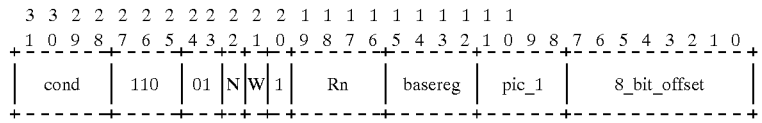

Where:
  The N bit specifies either LPMA32 (1) or LPMA16 (0).
  The W bit specifies writeback of basereg=offset * 4 to the base register if W=1.
  <basereg> specifies the first Piccolo register in <Rlist>.
  <8_bit_offset> specifies the number of registers to transfer.

For the LPMD variants P=1, U=0 and the instruction is encoded as:

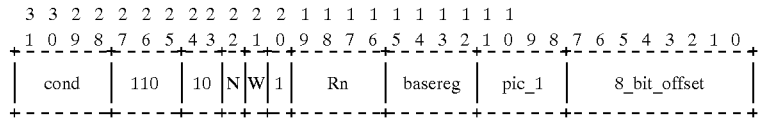

| | |
|---|---|
| LPM{cond}[A\|D][32\|16] | Rn{!}, <Rlist>, #<wordcount> |

For the LPMA variants P=0, U=1 and the instruction (in this case and hereafter using the pic_2, bnk and wrp format) is encoded as:

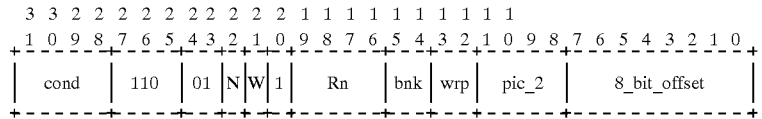

Where:
  The N bit specifies either LPMD32 (1) or LPMD16 (0).
  The W bit specifies writeback of basereg + offset * 4 to the base register if W=1.

\<bnk\> specifies the first register in \<Rlist\>, which must be at the base of a bank (i.e. A0, X0, Y0 or Z0). It takes the value 0–3 to indicate banks A–Z, respectively.

\<wrp\> specifies the wrapping point, which can be 1–3 representing a wrap value of 2, 4 or 8 16-bit registers.

\<8_bit_offset\> specifies the number of data items to transfer. It will take the value \<wordcount\>/4.

For the LPMD variants P=1, U=0 and the instruction is encoded as:

```
 3 3 2 2 2 2 2 2 2 2 2 2 1 1 1 1 1 1 1 1 1 1
 1 0 9 8 7 6 5 4 3 2 1 0 9 8 7 6 5 4 3 2 1 0 9 8 7 6 5 4 3 2 1 0
+------+---+--+-+-+-+------+---+---+------+-------------+
| cond | 110 |10|N|W|1|  Rn  |bnk|wrp| pic_2 | 8_bit_offset |
+------+---+--+-+-+-+------+---+---+------+-------------+
```

| LPM{cond}[A\|D]16 | Rn{!}, \<bank0.1\>, #\<wordcount\> |
|---|---|

For the LPMA variants P=0, U=1 and the encoding is:

```
 3 3 2 2 2 2 2 2 2 2 2 2 1 1 1 1 1 1 1 1 1 1
 1 0 9 8 7 6 5 4 3 2 1 0 9 8 7 6 5 4 3 2 1 0 9 8 7 6 5 4 3 2 1 0
+------+---+--+-+-+-+------+---+---+------+-------------+
| cond | 110 |01|0|W|1|  Rn  |bnk|01 | pic_2 | 8_bit_offset |
+------+---+--+-+-+-+------+---+---+------+-------------+
```

Where:

The W bit specifies writeback to the base register (1).

\<bnk\> specifies the Piccolo bank to transfer to. It can take the value 0–3 to represent the A, X, Y or Z banks.

\<8_bit_offset\> specifies the number of data items to transfer. It will take the value \<wordcount\>/4.

For the LPMD variants P=0, U=1 and the encoding is:

```
 3 3 2 2 2 2 2 2 2 2 2 2 1 1 1 1 1 1 1 1 1 1
 1 0 9 8 7 6 5 4 3 2 1 0 9 8 7 6 5 4 3 2 1 0 9 8 7 6 5 4 3 2 1 0
+------+---+--+-+-+-+------+---+---+------+-------------+
| cond | 110 |01|0|W|1|  Rn  |bnk|01 | pic_2 | 8_bit_offset |
+------+---+--+-+-+-+------+---+---+------+-------------+
``` the reorder buffer with data from the ARM Registers

Summary of formats

The MPR instruction format is provided for transferring a word of data from an ARM register to the Piccolo reorder buffer. The following formats are available for the MPR instruction:

| MPR{cond} | dest, Rn |
|---|---|
| MPR{cond}W | dest, Rn | where:

{ } indicates an optional field.

cond is the ARM instruction condition code field.

dest specifies the Piccolo destination register (A0–Z3).

Rn is an expression evaluating to a valid ARM register number.

w indicates that the data transferred from the ARM register should be treated as two 16-bit values and tagged for the Piccolo register dest0.1

Instruction encoding-

The MPR instruction is encoded as an ARM MCR instruction.

| MPR{cond} | dest, Rn |
|---|---|

```
 3 3 2 2 2 2 2 2 2 2 2 2 1 1 1 1 1 1 1 1 1 1
 1 0 9 8 7 6 5 4 3 2 1 0 9 8 7 6 5 4 3 2 1 0 9 8 7 6 5 4 3 2 1 0
+------+------+------+------+------+-------+-----+-+------+
| cond | 1110 | 0010 | dest |  Rn  | pic_1 | 000 |1| 0000 |
+------+------+------+------+------+-------+-----+-+------+
```

MPR{cond}W   dest, Rn

```
 3 3 2 2 2 2 2 2 2 2 2 2 1 1 1 1 1 1 1 1 1 1
 1 0 9 8 7 6 5 4 3 2 1 0 9 8 7 6 5 4 3 2 1 0 9 8 7 6 5 4 3 2 1 0
+------+------+------+------+------+------+----+-+------+
| cond | 1110 | 0010 | dest |  Rn  | pic_2| 000|1| 0000 |
+------+------+------+------+------+------+----+-+------+
```

Storing data from the output FIFO to memory
Summary of formats
Two major instruction formats are provided for storing data items from the output FIFO to memory.
  STP
  SPM
Both instruction formats are encoded as ARM STC instructions. The STP instruction class always stores one 32-bit data word from the output FIFO to memory. The SPM instruction class may be used to store multiple words to memory. The following formats are available for the two instructions:
STP{cond}[32|16] address
SPM{cond}[A|D][32|16] Rn{!}, #<wordcount>
where:
  { } indicates an optional field.
  cond is the ARM instruction condition code field.
  32|16 indicates whether the data being stored should be treated as 16-bit data, and endianess-specific action taken (see earlier), or as 32-bit data.
  address can be:
    [Rn]
    [Rn, #+ve_offset]{!}
    [Rn], #–ve_offset
  Rn is an expression evaluating to a valid ARM register number.
  ! indicates that the calculated address should be written back to the base register.
  #+ve_offset is an expression evaluating to an offset which can be expressed as +<8_bit₁₃ offset>*4. This offset is added to the base register to form the store address.
  #–ve_offset is an expression evaluating to an offset which can be expressed as –<8_bit_offset>*4. This offset is subtracted to the base register to form the post-store address.
  A|D indicates pre-increment (ascending) or post-decrement (descending) addressing modes.
  wordcount specifies the total number of data items transferred. For the first version of Piccolo, no more than 8 items of data can be transferred in one SPM instruction.

Instruction encoding
STP instructions
STP instructions transfer 1 32-bit word to memory. There are two variants:

| STP{cond}[32|16] | dest, [Rn], #–ve_offset |
| STP{cond}[32|16] | dest, [Rn, #+ve_offset]{!} |

The addressing mode is determined by the P and U bits.

| STP{cond}[32|16] | [Rn], #–ve_offset (P=0|U=0|W=1) |

The combination P=0, U=0 and W=1 is used to encode instructions of the form

| STP{cond}[32|16] | [Rn], #–ve_offset |

Only one word is transferred to the address [Rn]. The base register is decremented by 8_bit_offset*4 after the transfer has occurred. The N bit specifies either STP32 (1) or STP16 (0). The encoding of W=0 is not allowed. <8_bit_offset> encodes mod(#–ve_offset)/4.

```
 3 3 2 2 2 2 2 2 2 2 2 2 1 1 1 1 1 1 1 1 1 1
 1 0 9 8 7 6 5 4 3 2 1 0 9 8 7 6 5 4 3 2 1 0 9 8 7 6 5 4 3 2 1 0
+------+---+--+-+--+------+------+------+-------------+
| cond |110|00|N|10|  Rn  | 0000 | pic_1| 8_bit_offset|
+------+---+--+-+--+------+------+------+-------------+
```

| STP{cond}[32|16] | dest, [Rn, #+ve_offset]{!} (P=1|U=1) |

The combination P=1 and U=1 is used to encode instructions of the form

| STP{cond}[32|16] | dest, [Rn, #+ve_offset]{!} |

Only one word is transferred to the address [Rn+#+ve_offset]. If the W bit is set, the base register is incremented by 8_bit_offset*4. The N bit specifies either STP32 (1) or STP16 (0).
<8_bit_offset> encodes #+ve_offset/4.

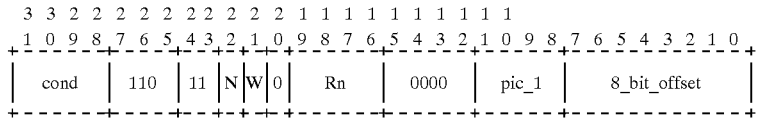

SPM instructions

SPM instructions transfer multiple words from memory. It has the following variants:

```
SPM{cond}[A|D][32|16]    Rn{!}, #<wordcount>
SPM{cond}[A|D][32|16]    Rn{!}, #<wordcount>
```

For the SPMA variants P=0, U=1 and the instruction is encoded as:

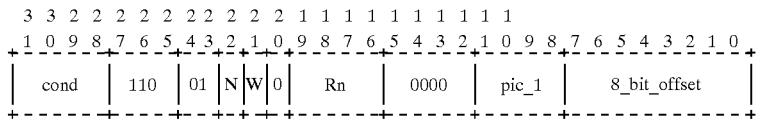

Where:
The N bit specifies either SPMA32 (1) or SPMA16 (0).
The W bit specifies writeback to the base register (1).
<8_bit_offset> specifies the number of data items to transfer.

For the LPMD variants P=1, U=0 and the instruction is encoded as:

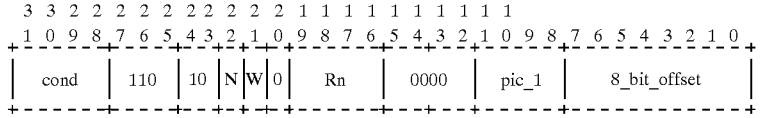

Where:
The N bit specifies either SPMD32 (1) or SPMD16 (0).

Transferring data from the output FIFO to the ARM where:
{ } indicates an optional field.
cond is the ARM instruction condition code field.
Rn is an expression evaluating to a valid ARM register number.

Instruction encoding
The MRP instruction is encoded as an ARM MRC instruction.

| MRP{cond} | Rn |
|---|---|

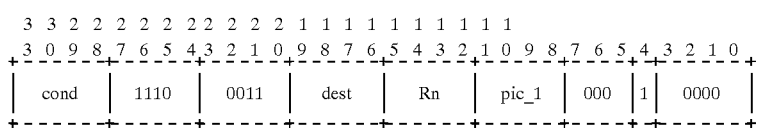

Summary of formats

The MRP instruction format is provided for transferring a word of data from the output FIFO to an ARM register. The following format is available for the MRP instruction:

| MRP{cond} | Rn |
|---|---|

Reserved Option

At an overall level it will be noted that the coding P=0, U=0 and W=0 is not allowed by the above and is reserved for future use.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:

(i) a central processing unit for executing central processing unit instructions to perform data processing operations, said central processing unit instructions including coprocessor memory access instructions;

(ii) a memory coupled to said central processing unit for holding data words;

(iii) a coprocessor coupled to said central processing unit and said memory, data words within said memory to be processed by said coprocessor being addressed using one of a plurality of addressing modes under control of said coprocessor memory access instructions executed by said central processing unit;

(iv) wherein at least one coprocessor memory access instruction includes addressing mode information controlling which of said plurality of addressing modes is used by said central processing unit to access said memory, said coprocessor using at least a portion of said addressing mode information to control how many data words are transferred between said memory and said coprocessor in response to said at least one coprocessor memory access instruction wherein said at least one coprocessor memory access instruction references a register within said central processing unit holding an address value and said address mode information includes an offset field, wherein a start address within said memory to be accessed is determined from at least one of said address value and said offset value upon execution of said at least one coprocessor memory access instruction.

2. Apparatus as claimed in claim 1, wherein said change made to said address value yields a final address value that is stored back into said register.

3. Apparatus as claimed in claim 1, wherein at least a portion of said offset field is used by said coprocessor to control how many data words are transferred between said memory and said coprocessor.

4. Apparatus as claimed in claim 3, wherein said addressing mode information includes one or more flags that control which of said plurality of addressing modes is used and also control whether or not said offset field is to be used by said coprocessor in determining how many data words are transferred between said memory and said coprocessor.

5. Apparatus as claimed in claim 4, wherein, when said offset field is not used by said coprocessor in determining how many data words are transferred between said memory and said coprocessor, a fixed number of data words are transferred between said memory and said coprocessor.

6. Apparatus as claimed in claim 4, wherein said register stores an address value of Rn, a data word is WL bytes in length, and said offset value is M and said one or more flags comprise three or more value bits that select said at least one coprocessor memory access instruction to operate in accordance with one of:

|     | Transfer Start Address Value | Final Value in Address Register | Number of Data Words Transferred |
| --- | --- | --- | --- |
| (i)    | Rn         | Rn−(WL*M)  | (fixed number) |
| (ii)   | Rn         | Rn         | M              |
| (iii)  | Rn         | Rn+(WL*M)  | M              |
| (iv)   | Rn−(WL*M)  | Rn         | M              |
| (v)    | Rn−(WL*M)  | Rn−(WL*M)  | M              |
| (vi)   | Rn+(WL*M)  | Rn         | (fixed number) |
| (vii)  | Rn+(WL*M)  | Rn+(WL*M)  | (fixed number) |

7. Apparatus as claimed in claim 6, wherein said flags comprise:

(i) a flag bit P that specifies whether said start address value is said address value originally stored in said register or an address value changed as specified by said offset field;

(ii) a flag bit U that specifies whether said change should be addition or subtraction of a value specified in said offset field from said address value originally stored in said register; and (iii) a flag bit W that specifies whether or not said final value in said address register should be stored back into said register.

8. Apparatus as claimed in claim 7, wherein said coprocessor evaluates P EOR U in order to determine whether one data word or M data words should be transferred.

9. Apparatus as claimed in claim 7, wherein said register may be a program counter register PC of said central processing unit and said coprocessor evaluates P EOR (UOR (register is PC)) in order to determine whether one data word or M data words should be transferred.

10. Apparatus as claimed in claim 6, wherein said at least one coprocessor memory access instruction references a register within said central processing unit holding an address value and said address mode information includes an offset field, wherein a start address within said memory to be accessed is determined from at least one of said address value and said offset value upon execution of said at least one coprocessor memory access instruction;

at least a portion of said offset field is used by said coprocessor to control how many data words are transferred between said memory and said coprocessor;

said addressing mode information includes one or more flags that control which of said plurality of addressing modes is used and also control whether or not said offset field is to be used by said coprocessor in determining how many data words are transferred between said memory and said coprocessor;

when said offset field is not used by said coprocessor in determining how many data words are transferred between said memory and said coprocessor, a fixed number of data words are transferred between said memory and said coprocessor; and said fixed number of data words comprises a single data word.

11. Apparatus as claimed in claim 1, wherein said central processing unit and said coprocessor perform digital signal processing operations and said data words transferred between said memory and said coprocessor include coefficient values from within an array of coefficient values stored in said memory.

12. A method of processing data, said method comprising the steps of:

(i) executing central processing unit instructions with a central processing unit to perform data processing operations, said central processing unit instructions including coprocessor memory access instructions;

(ii) holding data words in a memory coupled to said central processing unit;

(iii) addressing data words within said memory to be processed by a coprocessor coupled to said central processing unit and said memory using one of a plurality of addressing modes under control of coprocessor memory access instructions executed by said central processing unit;

(iv) wherein at least one of said coprocessor memory access instructions includes addressing mode information controlling which of said plurality of addressing modes is used by said central processing unit to access said memory, said coprocessor using at least a portion of said addressing mode information to control how many data words are transferred between said memory and said coprocessor in response to said at least one of said coprocessor memory access instructions and wherein said at least one coprocessor memory access instruction references a register within said central processing unit holding an address value and said address mode information includes an offset field, wherein a start address within said memory to be accessed is determined from at least one of said address value and said offset value upon execution of said at least one coprocessor memory access instruction.

13. Apparatus for processing data comprising:

(i) a central processing unit for executing central processing unit instructions to perform data processing operations, said central processing unit instructions including coprocessor memory access instructions;

(ii) a memory coupled to said central processing unit for holding data words;

(iii) a coprocessor coupled to said central processing unit and said memory, data words within said memory to be processed by said coprocessor being addressed using one of a plurality of addressing modes under control of said coprocessor memory access instructions executed by said central processing unit;

(iv) wherein at least one coprocessor memory access instruction includes addressing mode information controlling which of said plurality of addressing modes is used by said central processing unit to access said memory, said coprocessor sensing at least a portion of said addressing mode information to control how many data transfer cycles are used to transfer data words between said memory and said coprocessor in response to said at least one coprocessor memory access instruction.

14. A method of processing data, said method comprising the steps of:

(i) executing central processing unit instructions with a central processing unit to perform data processing operations, said central processing unit instructions including coprocessor memory access instructions;

(ii) holding data words in a memory coupled to said central processing unit;

(iii) addressing data words within said memory to be processed by a coprocessor coupled to said central processing unit and said memory using one of a plurality of addressing modes under control of coprocessor memory access instructions executed by said central processing unit;

(iv) wherein at least one of said coprocessor memory access instructions includes addressing mode information controlling which of said plurality of addressing modes is used by said central processing unit to access said memory, said coprocessor sensing at least a portion of said addressing mode information to control how many data transfer cycles are used to transfer data words between said memory and said coprocessor in response to said at least one of said coprocessor memory access instructions.

* * * * *